US011916610B2

(12) United States Patent
Tsuboi et al.

(10) Patent No.: US 11,916,610 B2
(45) Date of Patent: Feb. 27, 2024

(54) INTERFERENCE EVALUATION METHOD, INTERFERENCE EVALUATION APPARATUS AND INTERFERENCE EVALUATION PROGRAM

(71) Applicant: NIPPON TELEGRAPH AND TELEPHONE CORPORATION, Tokyo (JP)

(72) Inventors: Hideyuki Tsuboi, Musashino (JP); Hideki Toshinaga, Musashino (JP); Kazuto Goto, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 282 days.

(21) Appl. No.: 17/437,458

(22) PCT Filed: Mar. 11, 2020

(86) PCT No.: PCT/JP2020/010411
§ 371 (c)(1),
(2) Date: Sep. 9, 2021

(87) PCT Pub. No.: WO2020/189423
PCT Pub. Date: Sep. 24, 2020

(65) Prior Publication Data
US 2022/0166527 A1     May 26, 2022

(30) Foreign Application Priority Data
Mar. 15, 2019    (JP) ................................ 2019-048821

(51) Int. Cl.
*H04W 4/00*      (2018.01)
*H04B 17/336*      (2015.01)
(Continued)

(52) U.S. Cl.
CPC ......... *H04B 17/336* (2015.01); *H04B 17/391* (2015.01); *H04W 4/02* (2013.01)

(58) Field of Classification Search
CPC ...... H04W 4/02; H04B 17/336; H04B 17/391
(Continued)

(56) References Cited

U.S. PATENT DOCUMENTS 5,812,947 A *   9/1998   Dent .................... H01Q 25/007
                                                          455/12.1
8,358,588 B2 *   1/2013   Goldsmith ............. H04B 15/00
                                                          375/295

(Continued)

OTHER PUBLICATIONS

NTT Access Network Service Systems Laboratories, NTT Corporation, Radio wave propagation loss estimation software, TsuKuBa Year History, 2012.

(Continued)

*Primary Examiner* — Marceau Milord
(74) *Attorney, Agent, or Firm* — Harness, Dickey & Pierce, P.L.C.

(57) ABSTRACT

An interference evaluation method for evaluating, over an area, radio-wave interference that occurs between a first radio station and a second radio station includes: a distinguishing step of acquiring information indicating topographic cross-sections of respective azimuths centered about the first radio station, and distinguishing the topographic cross-section into a segment in which there is visibility from the position of the first radio station and a segment in which there is no visibility from the position of the first radio station; and a specification step of specifying a position at which a desired interference amount is reached based on a distance between the first radio station and the second radio station in a segment distinguished as having visibility from the position of the first radio station, and specifying a position at which the desired interference amount is reached (Continued)

by evaluating the radio-wave interference for each square of an evaluation target region segmented into squares in a segment distinguished as having no visibility from the position of the first radio station.

8 Claims, 29 Drawing Sheets

(51) Int. Cl.
*H04B 17/391* (2015.01)
*H04W 4/02* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 2002/0172186 | A1* | 11/2002 | Larsson | H04W 52/54 370/349 |
| 2003/0012166 | A1* | 1/2003 | Benveniste | H04W 56/00 370/349 |
| 2004/0037258 | A1* | 2/2004 | Scherzer | H04W 28/18 370/338 |
| 2007/0025398 | A1* | 2/2007 | Yonge, III | H04J 3/0655 370/508 |
| 2010/0034134 | A1* | 2/2010 | Larsen | H04W 16/28 455/63.1 |
| 2012/0163280 | A1* | 6/2012 | Maltsev | H04B 7/155 370/315 |
| 2016/0037356 | A1* | 2/2016 | Bathula | H04W 16/18 455/446 |
| 2016/0269911 | A1* | 9/2016 | Cheng | H04W 16/18 |
| 2016/0286433 | A1* | 9/2016 | Mirbagheri | H04L 27/2647 |
| 2020/0267568 | A1* | 8/2020 | Macey | H04W 16/18 |
| 2020/0366337 | A1* | 11/2020 | Xie | H04B 7/024 |

OTHER PUBLICATIONS

Motoharu Sasaki, Toward the use of high frequency bands in new wireless systems such as 5th generation mobile communication systems (5G), Journal of the ITU Association of Japan, vol. 46, No. 11, 2016, pp. 36-40.
Kei Iwamoto et al., White space database considering terrestrial topology, 2013 IEICE Communication Society Conference, Correspondence Lecture Proceedings 1, Sep. 17, 2013, pp. S-48-S-49.

* cited by examiner

Fig. 12

| | | EMBODIMENT | CONVENTIONAL TECHNIQUE A (CALCULATION FOR ENTIRE MESH) | CONVENTIONAL TECHNIQUE B (ADJUST MESH TO LESS THAN 100 × 100) |
|---|---|---|---|---|
| CALCULATION AMOUNT | EQUATION | 360 × (1/θ) × k | N × N | LESS THAN 100 × 100 |
| | EXAMPLE | 32,400 (θ=0.1, k=9) | 1,000,000 (WHEN N=1,000) | LESS THAN 10,000 |
| | | 468,000 (θ=0.01, k=13) | 100,000,000 (WHEN N=10,000) | LESS THAN 10,000 |
| | EVALUATION | ○ | × | ◎ |
| EVALUATION ACCURACY | EVALUATION | ○ | ◎ | △ |

Fig. 19

| INT./REC. | STATION NAME | LATITUDE 1 | LONGITUDE 1 | LATITUDE 2 | LONGITUDE 2 | SYSTEM NAME | ANTENNA NAME |
|---|---|---|---|---|---|---|---|
| INTERFERING | STATION 2 | 35.65X | 139.84X | — | — | SYSTEM_52 | B |
| INTERFERING | STATION 3 | 35.58X | 139.74X | — | — | SYSTEM_52 | B |
| INTERFERENCE-RECEIVING | STATION 4 | 35.46X | 139.62X | — | — | SYSTEM_52 | A |
| INTERFERENCE-RECEIVING | STATION 1 | 35.39X | 139.58X | — | — | SYSTEM_51 | A |

■ EXECUTION CONDITION DESIGNATION (MAP)

CALCULATION METHOD: ○ POINT CALCULATION  ● ENTIRE-AREA CALCULATION

INTERFERING/INTERFERENCE-RECEIVING INFORMATION
STATION SPECIFICATIONS REGISTERED [SELECT INTERFERING STATION] [SELECT INTERFERENCE-RECEIVING STATION]

[SELECT HISTORY] [CLEAR INPUT]

[NEW ADDITION] [CORRECT] [DELETE]

INTERFERENCE CONSIDERATION SPECIFICATIONS
RECEPTION LOCATION LOWEST RECEPTION [ ]dB  LOWEST INTERFERENCE MARGIN [ ]dB  SIMULTANEOUS-TRANSMISSION
ALTITUDE [ ]m  SENSITIVITY [ ]dB  WAVE [ ]dB  APPARATUSES COUNT [ ] APPARATUSES

AREA DESIGNATION
[SELECT AREA DESIGNATION FILE]  UPPER-LEFT LATI-[ ] LATI-[ ]  LOWER-RIGHT LATI-[ ] LATI-[ ]
                                 COORDINATE TUDE      TUDE        COORDINATE TUDE      TUDE

INTERFERING STATION ANTENNA DIRECTION
● WORST  ○ INTERFERING STATION DIRECTION DESIGNATION  ○ ALWAYS CERTAIN ANGLE WITH INTERFERENCE-RECEIVING STATION (DIFFERENCE ANGLE [ ] deg)

CALCULATION LEVEL DESIGNATION
☑ CONSIDER ATTENUATION DUE TO TOPOGRAPHY  [2 SQUARE LAW + RIDGE LOSS ▼]  ☐ CONSIDER ATTENUATION DUE TO BUILDINGS
☑ CONSIDER ADDITIONAL LOSS ( [ ] dB)

[TEMPORARY SAVE]  [EXECUTE CALCULATION]  [CLOSE]

MENU LOCATION FOR DESIGNATING CONDITION SETTING FOR ANTENNA DIRECTION IN INTERFERENCE CALCULATION SOFTWARE

INTERFERENCE EVALUATION METHOD, INTERFERENCE EVALUATION APPARATUS AND INTERFERENCE EVALUATION PROGRAM

CROSS-REFERENCE TO RELATED APPLICATIONS

This application is a 371 U.S. National Phase of International Application No. PCT/JP2020/010411 filed on Mar. 11, 2020, which claims priority to Japanese Application No. 2019-048821 filed on Mar. 15, 2019. The entire disclosures of the above applications are incorporated herein by reference.

TECHNICAL FIELD

The present invention relates to an interference evaluation method, an interference evaluation apparatus, and an interference evaluation program.

BACKGROUND ART

Recently, demand for radio communication has increased accompanying the widespread use of various radio communication systems, and straining of frequency resources has become a problem. In order to effectively use limited frequency resources, the same frequencies need to be used in common in different radio communications. Relating to this, there has been ongoing debate regarding effective use of a region (white space) in which radio waves of a frequency band allocated for broadcast, communication, or the like are not actually being used.

If the same frequency is to be used in common in different radio communications, radio-wave interference (hereinafter referred to as "interference") occurs in some cases. For this reason, there has been demand to perform evaluation of interference that occurs between radio stations in advance and to perform system design with consideration given to the result of that evaluation. This kind of interference evaluation needs to be performed based on, for example, information relating to an interfering station that causes interference to occur, information relating to an interference-receiving station that receives interference, and propagation loss of interference waves that attenuate due to the distance from the interfering station to the interference-receiving station, topography, other environmental conditions, and the like.

Incidentally, there is interference evaluation (hereinafter referred to as "areal interference evaluation") in which if one of the interfering station and the interference-receiving station has been specified, interference is evaluated which occurs when the other interference station is installed at a given location. In areal interference evaluation, various measurement results and propagation loss models relating to propagation of interference waves are used, as in the techniques disclosed in NPL 1 and NPL 2, for example.

In areal interference evaluation, for example, an interference level between an interfering station and an interference-receiving station in a case where one interference station is arranged at a given position in a designated area using the position of the other interference station as a reference is calculated. FIG. 28 is a schematic view showing an overview of areal interference evaluation. For example, in FIG. 28, the surrounding area of the position of an interfering station, which is known, is segmented in the form of squares (a mesh) on the map, using the position of the interfering station as a reference. Also, a direction of an antenna of the interfering station is provided in advance, and is indicated in FIG. 28 by an arrow mark. Also, FIG. 28 shows a result of interference evaluation in a case where an interference-receiving station is arranged at position in the center of a given square in a mesh, using the position of the interfering station and the direction of the antenna as prerequisite conditions. Specifically, squares in which the influence of interference from the interfering station is within an allowable range are denoted as "OK areas", and squares in which the allowable range is exceeded are denoted as "NG areas".

Also, in areal interference evaluation, for example, evaluation relating to areas reached by radio waves is performed. FIG. 29 is a schematic view showing an overview of evaluation of an area reached by radio waves. For example, in FIG. 29, similarly to the interference evaluation shown in FIG. 28, the surrounding area of the position of the interfering station is segmented in the form of a mesh on the map, using the position of the interfering station as a reference. Also, the direction of the antenna of the interfering station is provided in advance. Also, in FIG. 29, using the position of the interfering station and the direction of the antenna as prerequisite conditions, the received power of the radio waves from the interfering station at the position of a given square in the mesh is displayed as a heat map. For example, FIG. 29 shows that the received power is about "−21 to −30 [dBm]", "−41 to −50 [dBm]", and "−31 to −40 [dBm]" at the locations of "interference-receiving station A", "interference-receiving station B", and "interference-receiving station C" respectively. Accordingly, it is possible to understand that "interference-receiving station A" is the most influenced by interference, and "interference-receiving station B" is the least influenced by interference.

Furthermore, in areal interference evaluation, a heat map of received power is generated in some cases with consideration given also to whether or not there is blocking of radio waves due to topography, for example. In specification of the range of a white space in particular, it is important to give consideration to the influence of blocking of radio waves resulting from topography.

CITATION LIST

Non-Patent Literature

[NPL 1] "Radio-wave propagation loss estimation software", TsuKuBa History, NTT Access Network Service Systems Laboratories, 2012

[NPL 2] Motoharu SASAKI, "Toward Use of a High-Frequency Band in a New Radio System such as a Fifth-Generation Mobile Communication Sytem (5G)", ITU Journal, Vol. 46, No. 11, November 2016

[NPL 3] Kei IWAMOTO and others, "White Space Database for Determining whether or not Use is Possible with Consideration Given to Topography", 2013 IEICE Communications Society General Conference, Proceedings 1, BS-8-7, S-48 & 49, Sep. 17 to 20, 2013

SUMMARY OF THE INVENTION

Technical Problem

Incidentally, in areal interference evaluation, the accuracy of the evaluation result increases the smaller the squares that the range designated as the evaluation target is segmented into are. However, on the other hand, the calculation amount required for interference evaluation increases in inverse proportion to the square of the width of a square. For this reason, there has been a problem in that when the width of a square is made too small in order to increase the accuracy of interference evaluation, interference evaluation cannot be performed in a realistic calculation time.

In view of the above-described circumstances, an object of the present invention is to provide a technique according to which it is possible to reduce a calculation amount while maintaining the accuracy of the interference evaluation.

Means for Solving the Problem

One aspect of the present invention is an interference evaluation method for evaluating, over an area, radio-wave interference that occurs between a first radio station and a second radio station, the interference evaluation method including: a distinguishing step of acquiring information indicating topographic cross-sections of respective azimuths centered about the first radio station, and distinguishing each topographic cross-section into a segment in which there is visibility from the position of the first radio station and a segment in which there is no visibility from the position of the first radio station; and a specification step of specifying a position at which a desired interference amount is reached based on a distance between the first radio station and the second radio station in a segment distinguished as having visibility from the position of the first radio station, and specifying a position at which the desired interference amount is reached by evaluating the radio-wave interference for each square of an evaluation target region segmented into squares in a segment distinguished as having no visibility from the position of the first radio station.

Also, one aspect of the present invention is the above-described interference evaluation method, in which a segment in which there is no visibility from the position of the first radio station is distinguished based on a position of a ridge included in the topographic cross-section.

Also, one aspect of the present invention is the above-described interference evaluation method, in which in the specification step, by starting a search using a position at a distance equal to the distance between the first radio station and a position at which the desired interference amount is reached, the position having been specified in the evaluation of the radio-wave interference for a first topographic cross-section, as an initial position of a position search in the evaluation of the radio-wave interference for a second topographic cross-section adjacent to the first topographic cross-section, the radio-wave interference for the second topographic cross-section is evaluated.

Also, one aspect of the present invention is the above-described interference evaluation method, further including a number provision step of providing direction numbers to the respective azimuths centered about the first radio station, in which in the specification step, if the radio-wave interference is to be evaluated for each square of the evaluation target region segmented into the squares, the radio-wave interference is evaluated only for a square distinguished as being an evaluation target based on the direction number and the distance from the first radio station.

Also, one aspect of the present invention is the above-described interference evaluation method, in which in the specification step, the radio-wave interference is evaluated with consideration given to at least one of an antenna direction of the first radio station and an antenna direction of the second radio station.

Also, one aspect of the present invention is the above-described interference evaluation method, in which in the specification step, the radio-wave interference is evaluated with consideration given to a reception signal intensity of radio waves emitted from a communication opposite station configured to perform communication with the second radio station.

Also, one aspect of the present invention is an interference evaluation apparatus configured to evaluate, over an area, radio-wave interference that occurs between a first radio station and a second radio station, including a distinguishing unit configured to acquire information indicating topographic cross-sections of respective azimuths centered about the first radio station, and distinguish each topographic cross-section into a segment in which there is visibility from the position of the first radio station and a segment in which there is no visibility from the position of the first radio station; and a specification unit configured to specify a position at which a desired interference amount is reached based on a distance between the first radio station and the second radio station in a segment distinguished as having visibility from the position of the first radio station, and specify a position at which the desired interference amount is reached by evaluating the radio-wave interference for each square of an evaluation target region segmented into squares in a segment distinguished as having no visibility from the position of the first radio station.

Also, one aspect of the present invention is an interference evaluation program for causing a computer to execute the above-described interference evaluation method.

Effects of the Invention

According to the present invention, it is possible to reduce the calculation amount while maintaining the accuracy of interference evaluation.

BRIEF DESCRIPTION OF DRAWINGS

FIG. 12 is a diagram for illustrating comparison between interference evaluation according to the first embodiment of the present invention and interference evaluation according to a conventional technique.

FIG. 19 is a schematic diagram showing an example of an execution condition designation screen displayed by an interference evaluation apparatus 1 according to a fourth embodiment of the present invention.

DESCRIPTION OF EMBODIMENTS

First Embodiment

Hereinafter, interference evaluation performed by an interference evaluation apparatus 1 according to a first embodiment of the present invention will be described with reference to the drawings.

The interference evaluation apparatus 1 according to the present embodiment takes into consideration topography (peaks and valleys) in the areal interference evaluation. The interference evaluation apparatus 1 performs areal interference evaluation based on a topographic profile between interference stations.

Figure 1:
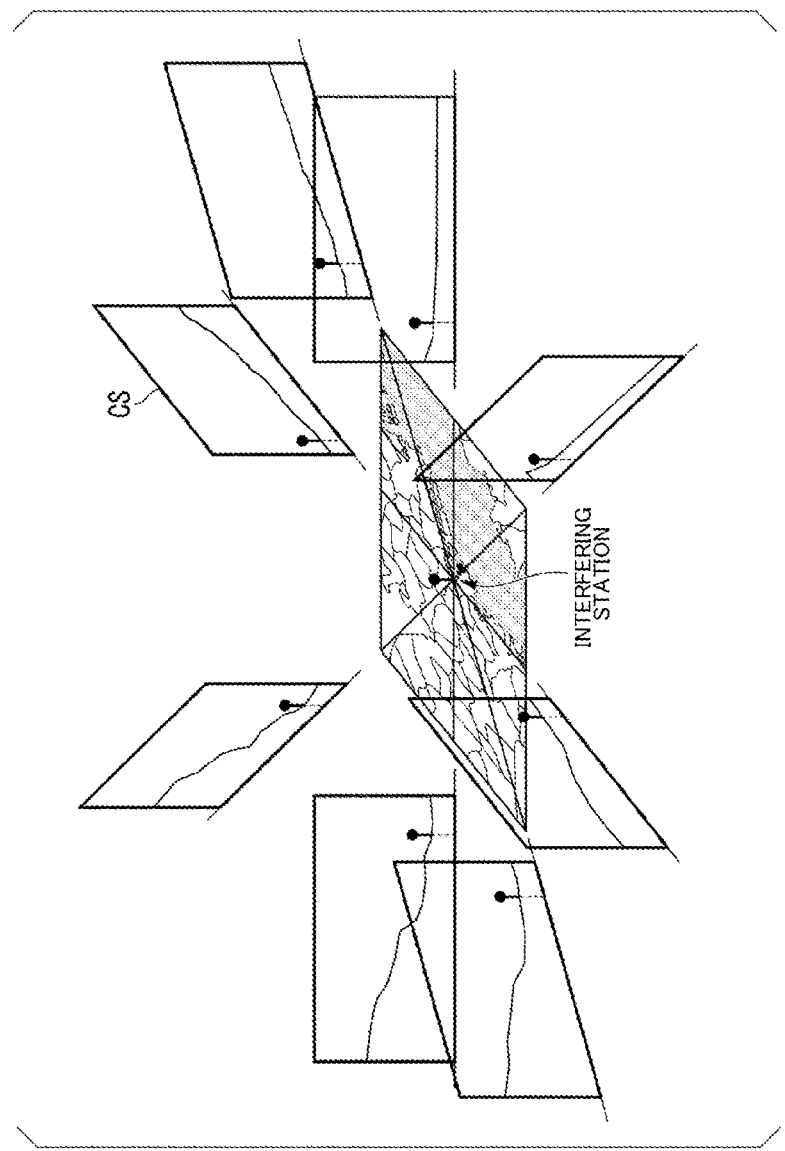
FIG. 1 is a schematic diagram for illustrating a topographic profile used by an interference evaluation apparatus 1 according to a first embodiment of the present invention.

FIG. 1 is a schematic diagram for illustrating a topographic profile used by the interference evaluation apparatus 1 according to the first embodiment of the present invention. As shown in FIG. 1, the interference evaluation apparatus 1 draws straight lines radially centered about the position of, for example, an interfering station, on a map including the target range of interference evaluation. Then, the interference evaluation apparatus 1 loads multiple topographic profiles taken along the cross-section lines extending radially. Then, for each topographic profile, the interference evaluation apparatus 1 specifies a position (hereinafter referred to as "reference level position") of an interference-receiving station at which the interference level (interference amount) in the interference-receiving station from an interfering station is a predetermined reference level.

Note that the reference level is an allowable interference level in the interference-receiving station. In the topographic profile, the interference evaluation apparatus 1 specifies the reference level position at which the interference level is at a predetermined reference level while moving the position of the interference-receiving station. Note that the reference level may also have a range, and for example, all positions at which the interference level is within the range of the predetermined reference level may also be set as reference level positions.

Operations of Interference Evaluation Apparatus

Figure 2:
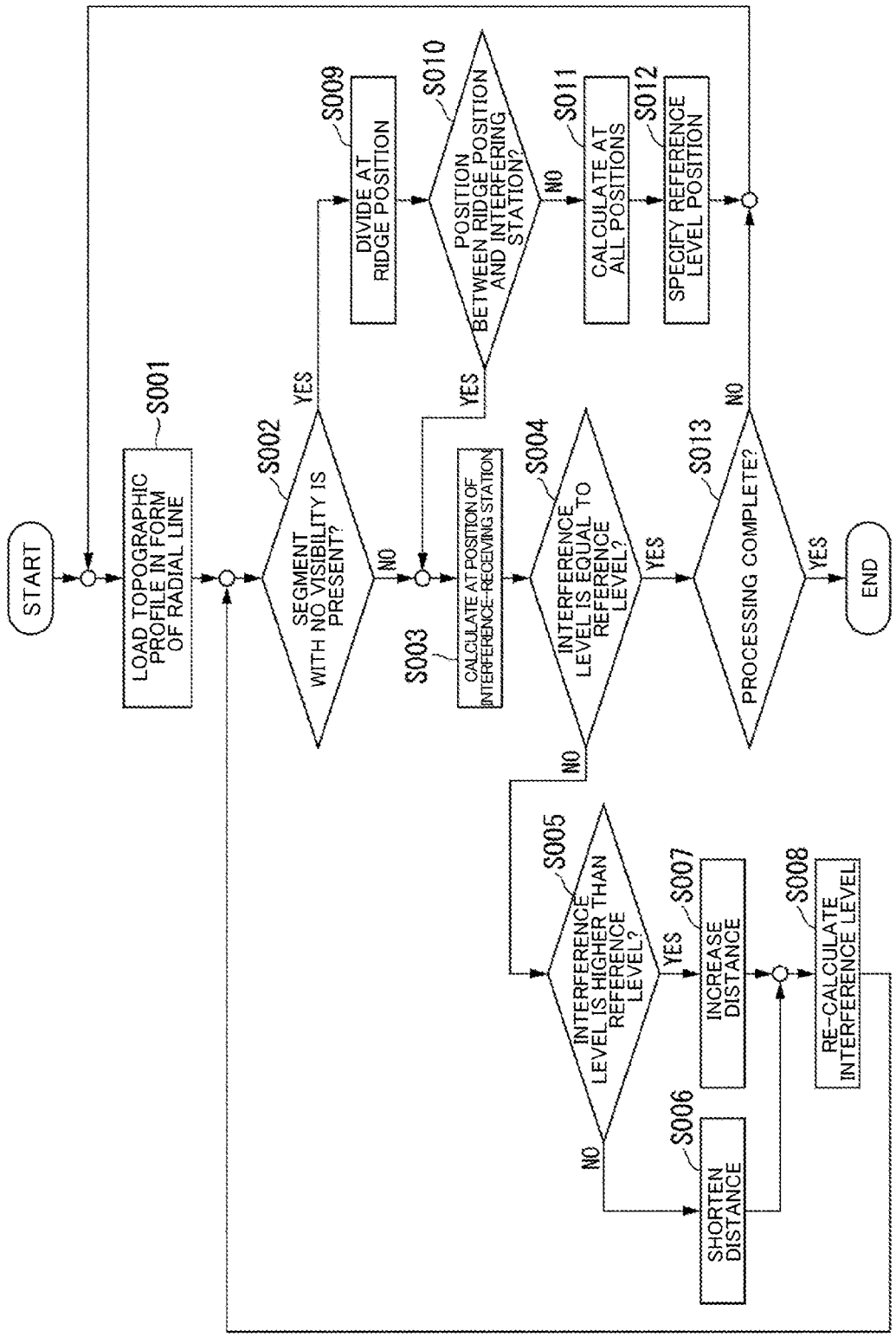
FIG. 2 is a flowchart showing an example of operations performed by the interference evaluation apparatus 1 according to the first embodiment of the present invention.

FIG. 2 is a flowchart showing an example of operations performed by the interference evaluation apparatus 1 according to the first embodiment of the present invention.

The interference evaluation apparatus 1 loads one topographic profile taken along a cross-section line extending radially (step S001). The interference evaluation apparatus 1 analyzes the loaded topographic profile and determines whether or not there is visibility between the interfering station and the interference-receiving station.

If there is visibility in all segments between the interfering station and the interference-receiving station in the loaded topographic profile (step S002: No), the interference evaluation apparatus 1 calculates the interference level at the position of the interference-receiving station (step S003). The interference evaluation apparatus 1 determines whether or not the calculated interference level is equal to a predetermined reference level (e.g., whether or not the calculated interference level is within the range of a predetermined reference level).

If the interference level is not equal to the reference level (step S004: No) and the interference level is lower than the reference level (step S005: No), the interference evaluation apparatus 1 moves the position of the interference-receiving station nearer to the direction of the interfering station by an amount corresponding to half the distance moved previously on the topographic profile (step S006). On the other hand, if the interference level is not equal to the reference level (step S004: No) and the interference level is higher than the reference level (step S005: Yes), the interference evaluation apparatus 1 moves the position of the interference-receiving station away from the direction of the interfering station by an amount corresponding to half the distance moved previously on the topographic profile (step S007).

Note that the following operations occur only during the first instance of movement. If the interference level is not equal to the reference level (step S004: No) and the interference level is lower than the reference level (step S005: No), the interference evaluation apparatus 1 moves the position of the interference-receiving station closer to the direction of the interfering station, to a position halfway between the interfering station and the interference-receiving station (step S006). On the other hand, if the interference level is not equal to the reference level (step S004: No) and the interference level is higher than the reference level (step S005: Yes), the interference evaluation apparatus 1 moves the position of the interference-receiving station away from the direction of the interfering station to a position that is twice the distance between the interfering station and the interference-receiving station (step S007).

Then, the interference evaluation apparatus 1 performs re-calculation of the interference level (step 008). The interference evaluation apparatus 1 specifies a reference level position at which the interference level reaches the predetermined reference level (e.g., the interference level is within the range of a predetermined reference level) by repeating the operations of step S002 and onward, which were described above, and moving the position of the interfering station.

On the other hand, if a segment with no visibility is present among the segments between the interfering station and the interference-receiving station in the loaded topographic profile (step S002: Yes), the interference evaluation apparatus 1 divides the segments between the interfering station and the interference-receiving station at positions at which ridges are formed (hereinafter referred to as "ridge positions") in the topographic profile (step S009). Then, the interference evaluation apparatus 1 performs respectively different analyses on the multiple divided segments and specifies respective reference level positions.

The position between the ridge position and the interfering station is a segment that has visibility. Accordingly, if the position of the interference-receiving station is a position between the ridge position and the interfering station (step S010: Yes), the interference evaluation apparatus 1 performs operations that are the same as the operations of step S003 and onward, which were described above. On the other hand, a position that is not between the ridge position and the interfering station is a segment that does not have visibility. If the position of the interference-receiving station is a position that is not between the ridge position and the interfering station (step S010: No), the interference evaluation apparatus 1 performs calculation of the interference level on all of the positions in the segment (that is, on all of squares in the mesh obtained by segmenting) (step S011). Then, the interference evaluation apparatus 1 specifies the reference level position (step S012).

The interference evaluation apparatus 1 performs the above-described processing in sequence on all of the topographic profiles, and if the processing performed on all of the topographic profiles is complete (step S013: Yes), the operation is ended. With that, the operation of the interference evaluation apparatus 1 indicated by the flowchart of FIG. 2 ends.

Specific Example of Interference Evaluation Method

Figure 3:
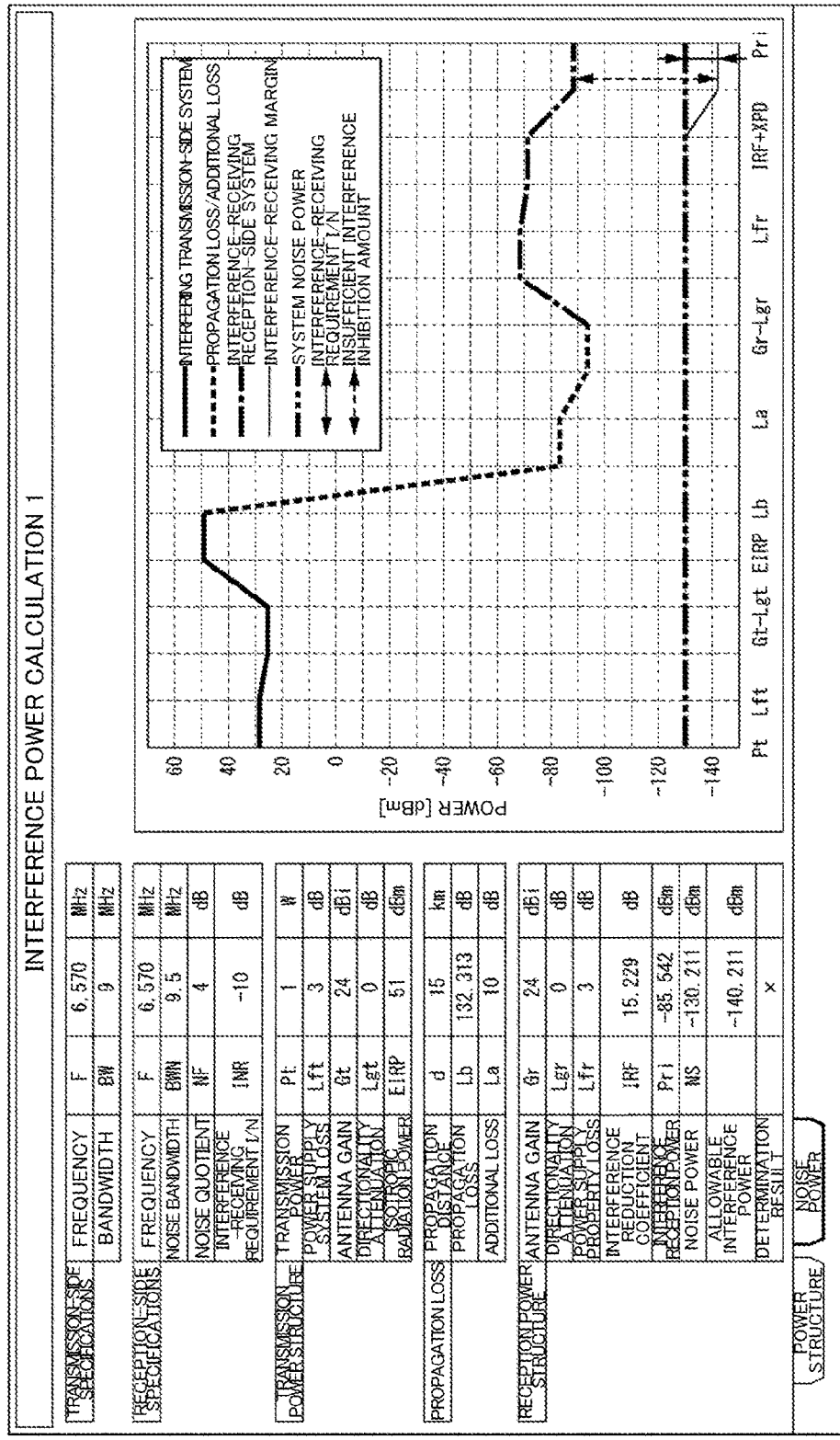
FIG. 3 is a diagram showing an example of an interference calculation screen using general-purpose table calculation software.

The above-described interference evaluation was conventionally performed using, for example, general-purpose table calculation software or the like by a person having expert knowledge or skill relating to radio-wave propagation loss, a specification of a radio apparatus, or the like. For example, FIG. 3 is a diagram showing an example of an interference calculation screen using general-purpose table calculation software. As illustrated, multiple parameter items to be used in interference calculation are listed in the left-side portion of the interference calculation screen. Each parameter item is categorized into one of five categories, namely "transmission-side specifications", "reception-side specifications", "transmission power structure", "propagation loss", and "reception-side power structure". Appropriate values need to be set according to specific individual examples of interference evaluation in these listed parameter items.

Also, a line design graph obtained by expressing a calculation result of an interference calculation using a line graph is displayed on the right-side portion of the interference calculation screen shown in FIG. 3. The line design graph is generated based on the values set for the parameter items listed in the left-side portion of the interference calculation screen. As shown in FIG. 3, the line design graph shows power values of a transmission power calculated based on the values of the parameter items "interfering transmission-side system", "propagation loss/additional loss", and "interference-receiving reception-side system" in order from the left side to the right side. Accordingly, the transmission power structure is indicated. Also, the line design graph shows a value of an interference-receiving margin obtained with consideration given to an interference-receiving requirement I/N with respect to a system noise power. According to this, an insufficient interference inhibition amount, which is a difference value between the calculated power value of the transmission power and the value of the interference-receiving margin, is calculated.

Note that although a later-described fifth embodiment will be described regarding the above-described interference-receiving requirement I/N, this embodiment corresponds to an interference allowable level I/N that was stated regarding FIG. 26, which is related to first to fourth embodiments, which were given for comparison.

On the interference calculation screen, which was shown as one example in FIG. 3, the calculated power value of the transmission power does not satisfy the value of the interference-receiving margin as a result of the calculation of the interference calculation. That is, the allowable interference power amount in the interference-receiving station is excessive with respect to the influence of the interference received by the interference-receiving station from the interfering station. Accordingly, it is determined that the interfering station and the interference-receiving station cannot be used (used in common) at the same time. Accordingly, the sign "x", which indicates that common use is not possible, is displayed in the display field for the item "determination result" on the interference calculation screen shown in FIG. 3.

Figure 4:
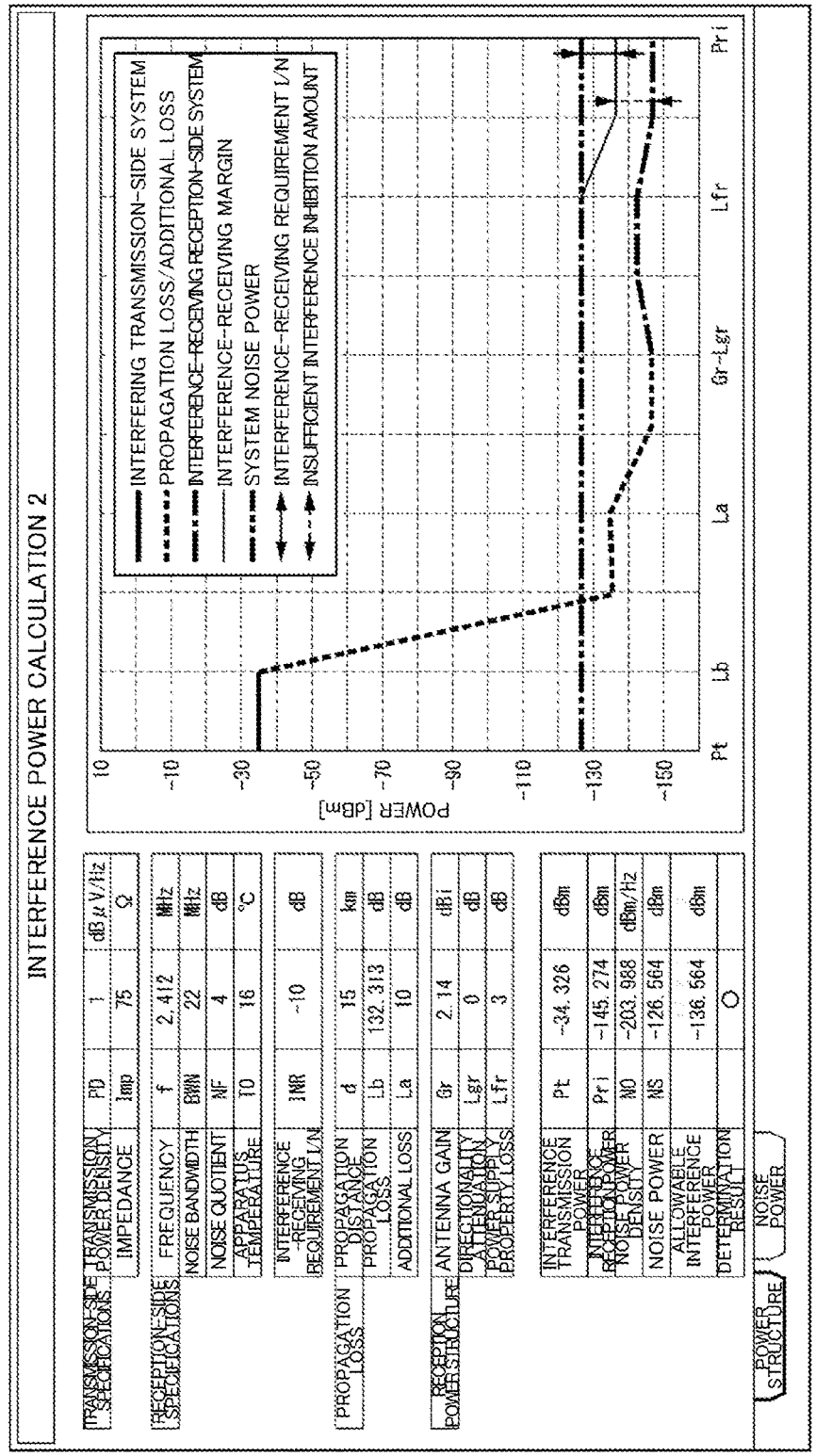
FIG. 4 is a diagram showing another example of an interference calculation screen using general-purpose table calculation software.

FIG. 4 is a diagram showing another example of an interference calculation screen using general-purpose table calculation software. As illustrated, multiple parameter items to be used in interference calculation are listed in the left-side portion of the interference calculation screen. Each parameter item is categorized into one of four categories, namely "transmission-side specifications", "reception-side specifications", "propagation loss", and "reception-side power structure". Appropriate values need to be set according to separate specific examples of interference evaluation in these listed parameter items.

However, in the case of the interference calculation screen shown in FIG. 4, the transmission-side apparatus indicated by "transmission-side specifications", which is displayed as a category, is not a radio apparatus for communication, but is an electrical apparatus or the like that radiates unneeded waves. That is, FIG. 4 illustrates an interference calculation screen in the case of performing line design by approximating the unneeded waves radiated by the electrical apparatus or the like as interference waves. In this example, a transmission power density of radiated unneeded waves is used as a parameter item of "transmission source specifications" for interference calculation.

Also, similarly to FIG. 3, the line design graph is displayed on the right-side portion of the interference calculation screen shown in FIG. 4. In the interference calculation screen shown as an example in FIG. 4, the transmission-side noise power is smaller than the allowable interference power of the receiving side, as a calculation result of the interference calculation. That is, the receiving side can allow the influence of the interference from the transmission side. Accordingly, it is determined that the interfering station and the interference-receiving station cannot be used (used in common) at the same time. Accordingly, a sign "o" indicating that common use is possible is displayed in the display field of the item "determination result" in the interference calculation screen shown in FIG. 4.

Note that examples of specific applications of the above-described interference evaluation include an interference evaluation relating to a transmission station and a reception station on the ground and interference evaluation relating to a satellite and a radio device on the ground.

As described above, for example, various parameters as shown on the left side of the interference calculation screen in FIG. 3 are used in the calculation of the interference level. These parameters are categorized into "interfering transmission-side system", "propagation loss/additional loss", "interference-receiving reception-side system", "interference-receiving margin", and "system noise power", as shown in the field of the key on the right side of the interference calculation screen of FIG. 3. For example, in the operation of the interference evaluation apparatus 1 shown in FIG. 2, the calculation of the above-described interference level is repeated by changing the parameters of "propagation loss/ additional loss" such as "propagation distance" and "topography" (not shown), the various parameters of "interfering transmission-side system", and the parameters of "interference-receiving reception-side system" such as "directionality attenuation".

Due to the interference calculation screen in the above-described table calculation software being operated by, for example, an operator, the reference level position is specified for a case in which there is visibility and a case in which there is no visibility between the interfering station and the interference-receiving station with respect to each direction of the multiple cross-section lines drawn radially. The result of the areal interference evaluation on the map is obtained due to the interference evaluation being performed with respect to the directions of all of the cross-section lines extending radially.

Procedure for Specifying Reference Level Position

Hereinafter, a procedure for specifying the reference level position performed by the interference evaluation apparatus 1 will be described.

Figure 5:
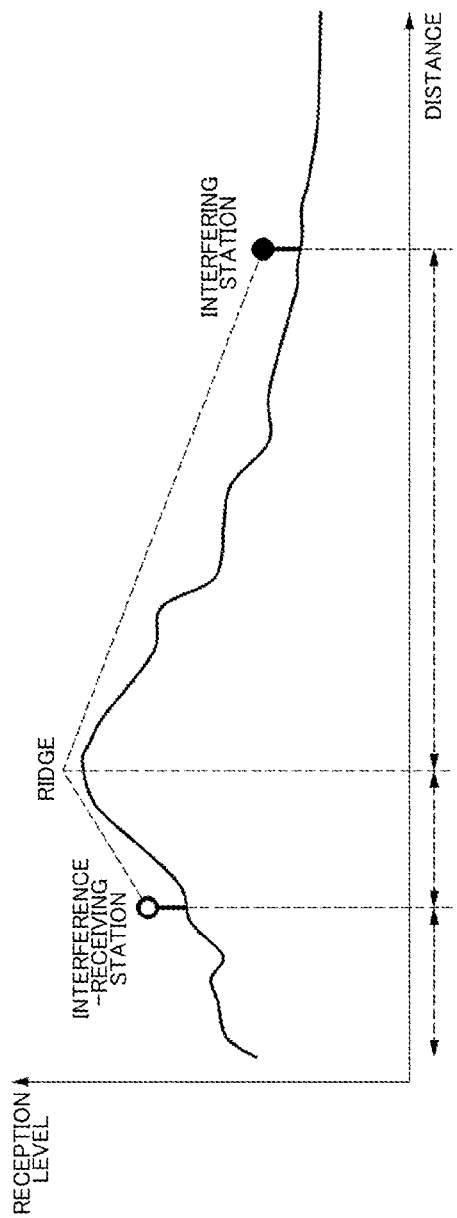
FIG. 5 is a diagram showing an example of analysis of a topographic profile in a case where there is no visibility (there is a ridge).

FIG. 5 is a diagram showing an example of analysis of a topographic profile in a case where there is no visibility (there is a ridge).

If there is a ridge in a segment between the interfering station and the interference-receiving station that is the target of performing the interference level calculation in the loaded topographic profile, the interference evaluation apparatus 1 determines that there is a segment in which there is no visibility in that segment. This corresponds to a case in which the result of step S002 is Yes in the flowchart shown in FIG. 2. Also, the interference evaluation apparatus 1 divides the target segment into a segment with no visibility and a segment with visibility using the ridge position in the topographic profile (step S009 in FIG. 2) and performs calculation of the interference level (steps S003 and S011 in FIG. 2) using a method corresponding to whether or not there is visibility in each divided segment.

Figure 6:
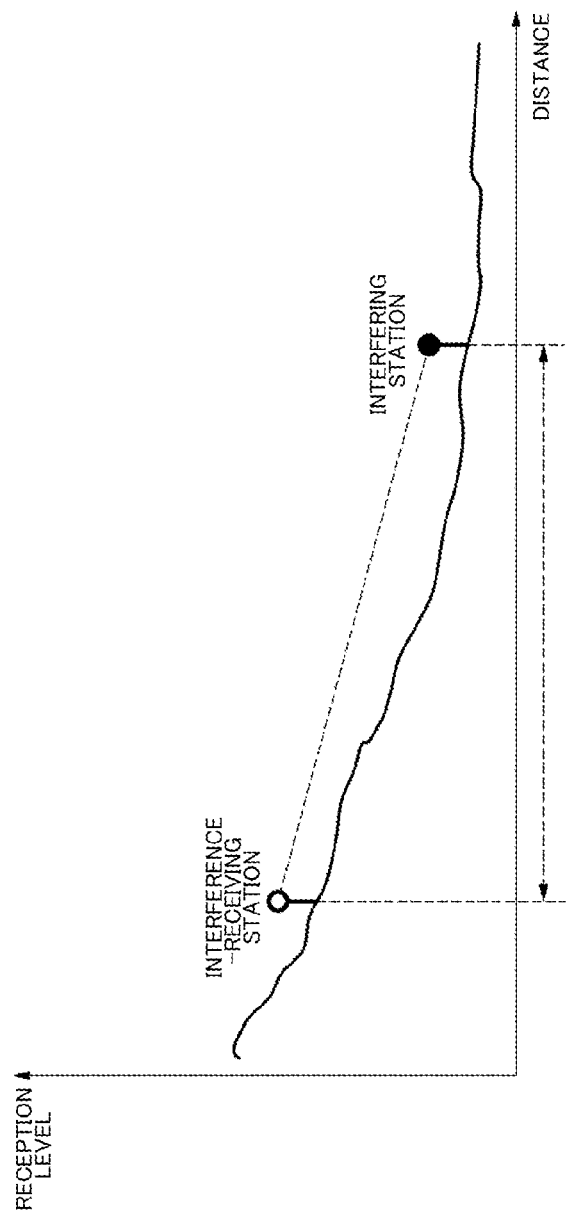
FIG. 6 is a diagram showing an example of analysis of a topographic profile in a case where there is visibility (there is no ridge).

FIG. 6 is a diagram showing an example of analysis of a topographic profile in a case where there is visibility (there is no ridge). If there is no ridge in the segment between the interfering station and the interference-receiving station, which are the targets of performing interference level calculation in the loaded topographic profile, the interference evaluation apparatus 1 determines that there is visibility in all of the segments between the interfering station and the interference-receiving station. This corresponds to a case in which the result of step S002 is No in the flowchart shown in FIG. 2. Then, the interference evaluation apparatus 1 calculates the interference level for a position of a given interference-receiving station.

Then, the interference evaluation apparatus 1 compares the calculated interference level and a predetermined reference level. Then, if the calculated interference level is higher than the reference level, the interference evaluation apparatus 1 moves the position of the interference-receiving station toward the interfering station on the topographic profile, and if the calculated interference level is lower than the reference level, the interference evaluation apparatus 1 moves the position of the interference-receiving station away from the interfering station. By repeating the above-described processing, the interference evaluation apparatus 1 specifies the reference level position for each loaded topographic profile.

Figure 7:
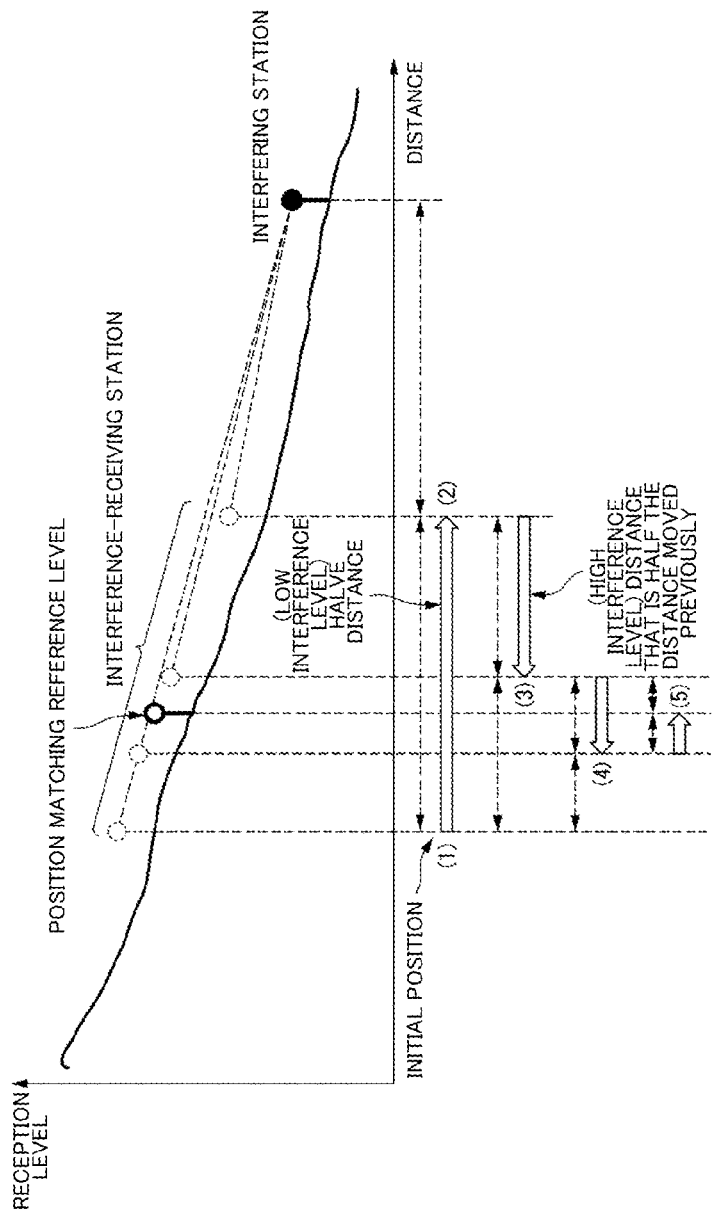
FIG. 7 is a diagram showing an example of a position specification procedure performed in a case where there is visibility by the interference evaluation apparatus 1 according to the first embodiment of the present invention.

FIG. 7 is a diagram showing an example of a position specification procedure performed in a case where there is visibility by the interference evaluation apparatus 1 according to the first embodiment of the present invention. As described above, the interference evaluation apparatus 1 specifies the reference level position at which the interference level becomes equal to the reference level while moving the position of the interference-receiving station on the topographic profile according to the height of the calculated interference level. The operation of the interference evaluation apparatus 1 described below corresponds to the operations of step S004 to S008 of the flowchart shown in FIG. 2.

The interference evaluation apparatus 1 first calculates the interference level at an initial position (1), which is a given position, on the topographic profile, and compares the calculated interference level and the reference level. If the interference level is lower than the reference level, the interference evaluation apparatus 1 brings the position of the interference-receiving station closer to the position of the interfering station such that the distance between the position of the interfering station and the position of the interference-receiving station is made half the length. That is, the interference evaluation apparatus 1 moves the position of the interference-receiving station to a position (position (2) in FIG. 7) between the position of the interfering station and the initial position (1).

Next, the interference evaluation apparatus 1 calculates the interference level at the position (2) on the topographic profile, and compares the calculated interference level and the reference level. If the interference level is higher than the reference level, the interference evaluation apparatus 1 moves the position of the interference-receiving station away from the position of the interfering station by an amount corresponding to half the length of the distance moved previously. For example, the interference evaluation apparatus 1 moves the position of the interference-receiving station to a position (position (3) in FIG. 7) between the initial position (1) and the position (2).

Next, the interference evaluation apparatus 1 calculates the interference level at the position (3) on the topographic profile, and compares the calculated interference level and the reference level. If the interference level is higher than the reference level, the interference evaluation apparatus 1 moves the position of the interference-receiving station away from the position of the interfering station by an amount corresponding to half the length of the distance moved previously. For example, the interference evaluation apparatus 1 moves the position of the interference-receiving station to a position (position (4) in FIG. 7) between the initial position (1) and the position (3).

Next, the interference evaluation apparatus 1 calculates the interference level at the position (4) on the topographic profile, and compares the calculated interference level and the reference level. If the interference level is lower than the reference level, the interference evaluation apparatus 1 moves the position of the interference-receiving station toward the position of the interfering station by an amount corresponding to half the length of the distance moved previously. That is, the interference evaluation apparatus 1 moves the position of the interference-receiving station to a position (position (5) in FIG. 7) between the position (3) and the position (4).

Next, the interference evaluation apparatus 1 calculates the interference level at the position (5) on the topographic profile, and compares the calculated interference level and the reference level. If the interference level is equal to the reference level, for example, if the interference level falls within the range of the predetermined reference level, the interference evaluation apparatus 1 specifies the position (5) as the reference level position.

The interference evaluation apparatus 1 performs the above-described operation on all of the loaded topographic profiles. By performing the above-described operation, the interference evaluation apparatus 1 can specify the reference level with a smaller calculation amount compared to the conventional method of performing calculation of the interference level for all squares of a map segmented in the form of a mesh.

Figure 8:
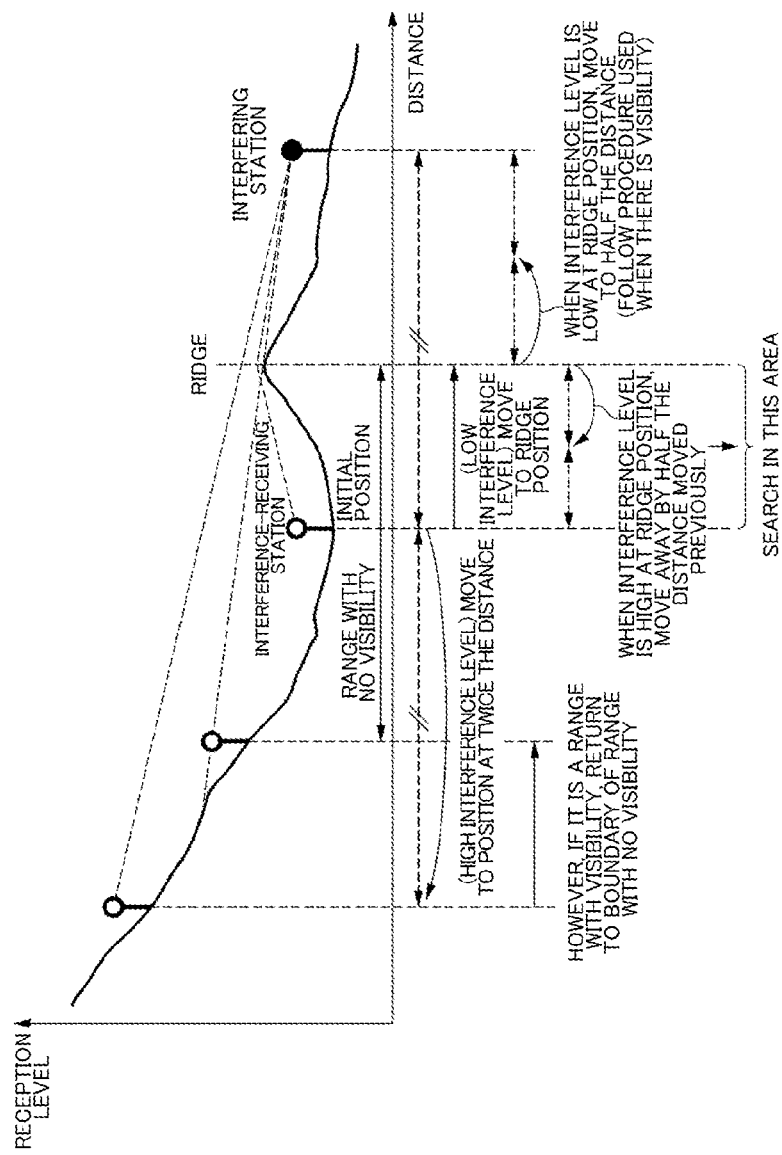
FIG. 8 is a diagram showing an example of a position specification procedure performed in a case where there is no visibility by the interference evaluation apparatus 1 according to the first embodiment of the present invention.

FIG. 8 is a diagram showing an example of a position specification procedure performed in a case where there is no visibility by the interference evaluation apparatus 1 according to the first embodiment of the present invention. In the topographic profile shown in FIG. 8, if the interference-receiving station is viewed from the position of the interfering station, there is a segment in which there is visibility and a segment in which there is no visibility depending on the position of the interference-receiving station. This is because cases in which the visibility of the interference-receiving station from the interfering station is blocked due to peaks and valleys, and cases in which the visibility of the interference-receiving station from the interfering station is not blocked occur depending on the position of the interference-receiving station, due to there being peaks and valleys in the topography.

For example, it is assumed that the interference evaluation apparatus 1 has first calculated an interference level at an initial position, which is a position of a segment in which there is no visibility, on the topographic profile. In this case, the interference evaluation apparatus 1 compares the calculated interference level and the reference level, and if the interference level is lower than the reference level, the interference evaluation apparatus 1 moves the position of the interference-receiving station to the ridge position.

On the other hand, if the interference level is higher than the reference level, the interference evaluation apparatus 1 moves the position of the interference-receiving station away from the position of the interfering station such that the distance between the interfering station and the interference-receiving station is twice the distance between the interfering station and the initial position. However, in this case, the position of the moved interference-receiving station is in a segment with visibility in some cases. For this reason, it is necessary to move the position of the interfering station to the boundary between a segment with visibility and a segment with no visibility.

However, due to the fact that the range with no visibility is limited in the target range of interference evaluation, it is thought that the calculation amount will not be extremely increased even if calculation of the interference level is performed on all of squares of a map segmented in the form of a mesh in a range with no visibility.

On the other hand, since the segment from the interfering station to the ridge position is a segment with visibility, the interference evaluation apparatus 1 specifies the reference level position at which the interference level is equal to the reference level in accordance with the position specification procedure used when there is visibility, which was described above with reference to FIG. 7.

Setting of Initial Position

In the above-described position specification procedure, it was assumed that the initial position is set to any position, but the initial position may also be set using the procedure described below.

Figure 9:
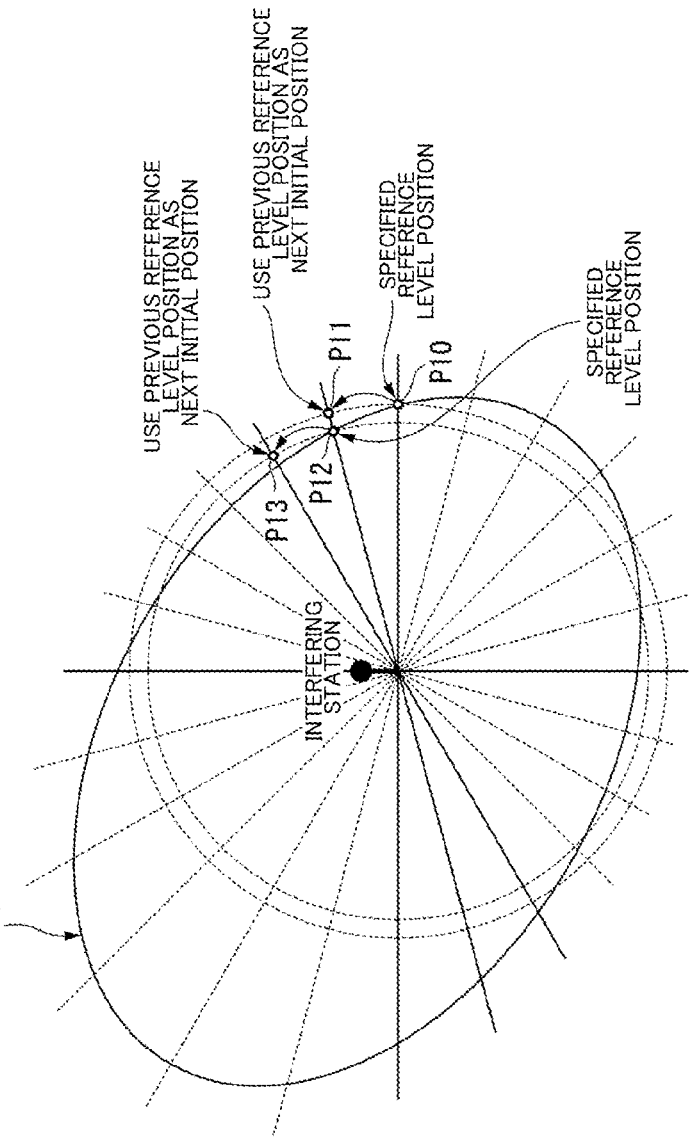
FIG. 9 is a diagram showing an example of an initial position setting procedure in position specification performed by the interference evaluation apparatus 1 according to the first embodiment of the present invention.

FIG. 9 is a diagram showing an example of an initial position setting procedure in position specification performed by the interference evaluation apparatus 1 according to the first embodiment of the present invention. The interference evaluation apparatus 1 performs interference evaluation on a certain topographic profile, and thereafter sets the initial position using the previous result of the interference evaluation when performing interference evaluation on the next topographic profile.

As shown in FIG. 9, the reference position specified through the interference evaluation performed by the interference evaluation apparatus 1 on a certain topographic profile is a position P10. The interference evaluation apparatus 1 sets the initial position used when performing interference evaluation on the next topographic profile to a position P11, which is a position that is at a distance equal to the distance from the interfering station to the position P10. That is, the interference evaluation apparatus 1 sets the position P11, which is an intersection point between a circle including the position P10 that is centered about the interfering station, and the adjacent cross-section line extending radially as the initial position of the interference evaluation on the next topographic profile.

The interference evaluation apparatus 1 performs interference evaluation using the position P11 as the initial position and specifies the reference level position. Here, the specified reference level position is the position P12 shown in FIG. 9. The interference evaluation apparatus 1 sets the initial position used when performing interference evaluation on the next topographic profile to a position P13, which is a position that is at a distance equal to the distance from the interfering station to the position P12.

By repeating the above-described processing, a boundary line composed of a set of specified reference level positions including the position P10 and the position P12 is drawn. This boundary line is a boundary line indicating a border between whether or not reception of the influence of interference is allowable. That is, the outside of the boundary line is an allowable area in which the influence of interference is allowable. On the other hand, the inside of the boundary line is an unallowable area in which the influence of the interference is not allowable.

Note that the operation of the interference evaluation apparatus 1 relating to the above-described setting of the initial position corresponds to the operation of step S003 in the specification of the reference level position in the case where there is visibility in the flowchart shown in FIG. 2.

In general, the reference level positions of both topographic profiles taken along adjacent cross-section lines that extend radially are often present at positions that are relatively close to each other. For this reason, as described above, search can be started from a position that is relatively close to the reference level position to be specified, by setting the position at a distance equal to the distance between the reference level position set through interference evaluation on the previous topographic profile and the position of the interfering station as the initial position for interference evaluation on the next topographic profile (taken along the adjacent cross-sectional line extending radially). This makes it possible for the interference evaluation apparatus 1 to perform specification of the reference level position with a smaller calculation amount.

Distinguishing Whether or Not There is Visibility When Segment with No Visibility is Included As described above, if there is a ridge in a segment between the interfering station and the interference-receiving station that are the targets of performing the interference level calculation in the loaded topographic profile, the interference evaluation apparatus 1 determines that there is a segment in which there is no visibility in that segment. Then, the interference evaluation apparatus 1 divides the topographic profile into a segment with visibility and a segment with no visibility using the ridge position, and calculates respective interference levels for each divided segment using a method corresponding to whether or not there is visibility. Hereinafter, an example of a procedure for distinguishing into segments with visibility and segments with no visibility from the interfering station, which is performed by the interference evaluation apparatus 1, will be described.

Figure 10:
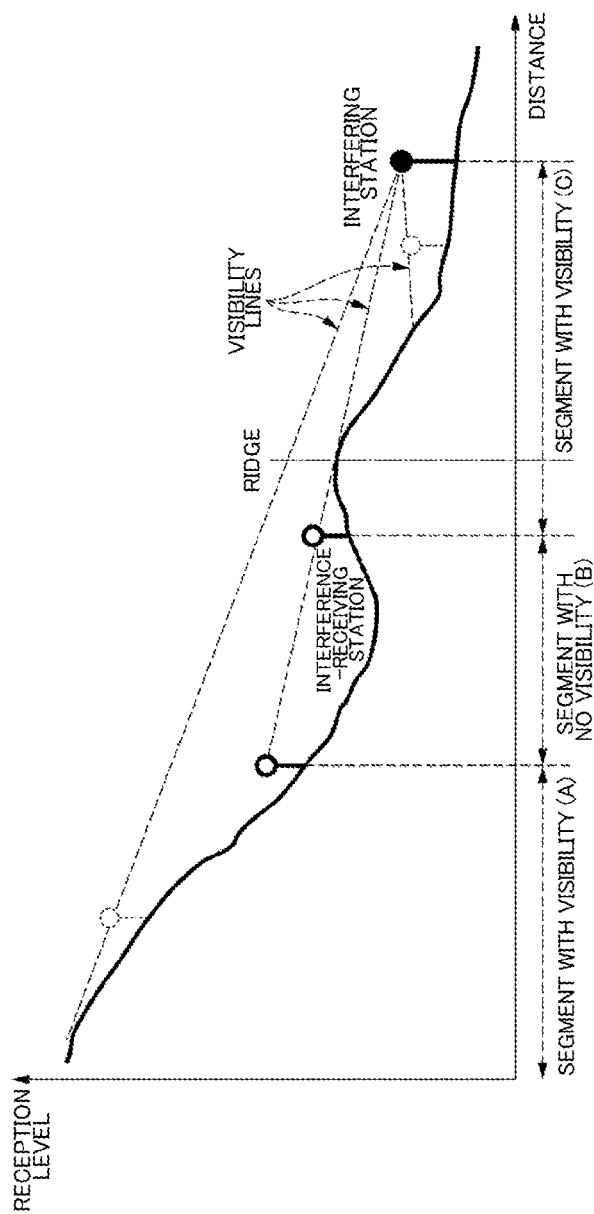
FIG. 10 is a diagram showing an example of a procedure for distinguishing whether or not there is visibility, performed by the interference evaluation apparatus 1 according to the first embodiment of the present invention.

FIG. 10 is a diagram showing an example of a procedure for distinguishing whether or not there is visibility, which is performed by the interference evaluation apparatus 1 according to the first embodiment of the present invention. As shown in FIG. 10, the interference evaluation apparatus 1 draws a straight line (hereinafter referred to as a "visibility line") that connects the position of the interfering station and the position of the interference-receiving station on the topographic profile. If the visibility line is not in contact with a topography line on the topographic profile, the interference evaluation apparatus 1 determines that the position of the interference-receiving station is in a segment with visibility. Note that a "topography line" in this context is a line indicating a position of the ground in a topographic profile. Also, "the ground" in this context also encompasses the surface of an object that is present on the ground, such as a building or a tree. On the other hand, if the visibility line is in contact with or intersects with a topography line on the topographic profile, the interference evaluation apparatus 1 determines that the position of the interference-receiving station is in a segment with no visibility.

Note that the position at which the visibility line and the topography line come into contact with each other corresponds to the above-described ridge line. The topographic profile illustrated in FIG. 10 is segmented into a segment (A) with visibility, a segment (B) with no visibility, and a segment (C) with visibility.

Regarding Multiple Reference Levels

In the above-described interference evaluation, there is only one interference level, but multiple reference levels with different stages may also be used. For example, reference levels of three stages, namely, a reference level set to a higher interference level, a reference level set to an intermediate interference level, and a reference level set to a lower interference level, or the like may also be used.

Figure 11:
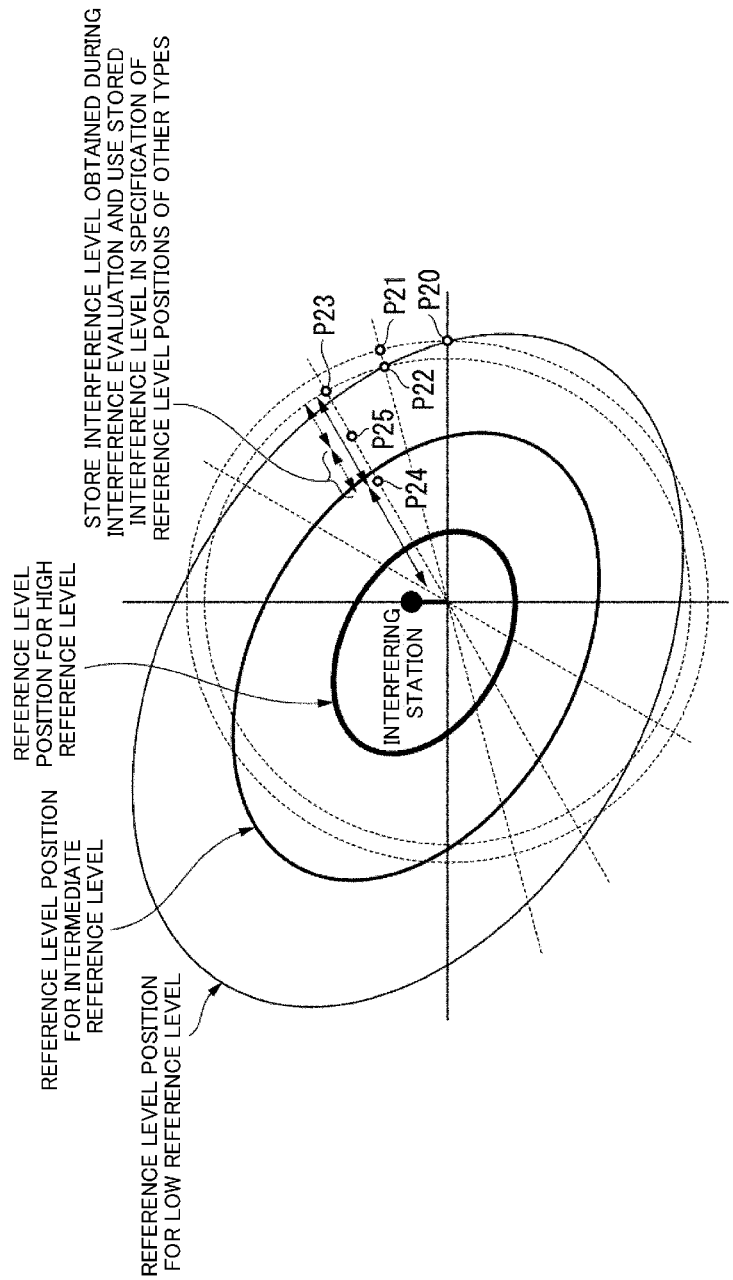
FIG. 11 is a diagram showing an example of an initial position setting procedure in position specification performed by the interference evaluation apparatus 1 according to the first embodiment of the present invention.

FIG. 11 is a diagram showing an example of a procedure for setting an initial position in position specification, which is performed by the interference evaluation apparatus 1 according to the first embodiment of the present invention. If multiple reference levels with different stages are to be used as described above, by storing a calculation result of the interference level calculated in the process of specifying one certain reference level position, it is possible to use the calculation result when setting the initial position of another reference level.

In the example shown in FIG. 9, the reference level position of one reference level indicating an allowable interference level is specified on the topographic profile taken along the cross-section line extending radially. On the other hand, in the example shown in FIG. 11, the reference level positions of multiple (three) reference levels with different stages are specified on the topographic profile taken along the cross-section line extending radially.

If the reference levels of three stages are provided as described above, three boundary lines, namely a boundary line obtained based on the reference level position of the high reference level, a boundary line obtained based on the reference level position of the intermediate reference level, and a boundary line obtained based on the reference level of the low reference level, are drawn as shown in FIG. 11 by performing the interference evaluation. This makes it possible to recognize not only the range in which interference is simply allowed, but also ranges corresponding to respective interference levels obtained with consideration given to, for example, multiple margins.

For example, in FIG. 11, the inside of the boundary line obtained based on the reference level position of the high reference level is a region in which the interference level is high. The inside of the boundary line obtained based on the reference level position of the intermediate reference level and the inside of the boundary line obtained based on the reference level position of the high reference level is a region in which the interference level is intermediate. The inside of the boundary line obtained based on the reference level position of the low reference level and the inside of the boundary line obtained based on the reference level position of the intermediate reference level is a region in which the interference level is low. The outside of the boundary line obtained based on the reference level position of the low reference level is a region in which the interference level has a small influence (or a region in which the interference has no influence).

As shown in FIG. 11, the reference level position of the low reference level, which was specified through interference evaluation performed by the interference evaluation apparatus 1 on a certain topographic profile, is a position P20. The interference evaluation apparatus 1 sets the initial position used when performing interference evaluation on the next topographic profile to a position P21, which is a position that is at a distance equal to the distance from the interfering station to the position P20. That is, the interference evaluation apparatus 1 sets the position P21, which is an intersection point between a circle including the position P20 that is centered about the interfering station, and the adjacent cross-sectional line extending radially as the initial position of the interference evaluation on the next topographic profile.

The interference evaluation apparatus 1 performs interference evaluation using the position P21 as the initial position and specifies the reference level position of the low reference level. Here, the specified reference level position of the low reference level is the position P22 shown in FIG. 11. The interference evaluation apparatus 1 sets the initial position used when performing interference evaluation on the next topographic profile to a position P23, which is a position that is at a distance equal to the distance from the interfering station to the position P22.

The interference evaluation apparatus 1 performs interference evaluation using the position P23 as the initial position. The interference evaluation apparatus 1 starts calculation of the interference level from the position P23, which is the initial position, and specifies the reference level position of the low reference level. For example, the interference evaluation apparatus 1 obtains the values of the interference levels at the position P24, the position P25, and the like shown in FIG. 11 in the process of specifying the reference level position of the low reference level. The interference evaluation apparatus 1 stores the values of the interference levels obtained in the process of the interference evaluation. Also, the interference evaluation apparatus 1 uses the stored values of the interference levels in the specification of the reference level positions of the intermediate reference level, or in the specification of the reference level positions of the high reference level.

For example, interference evaluation apparatus 1 sets the initial position obtained when performing specification of the reference level position of the intermediate reference level to the position P24 obtained in the process of specifying the reference level positions of the low reference level with respect to the previous topographic profile from the interfering station.

In this manner, for example, the interference evaluation apparatus 1 stores the values of the interference levels obtained each time the position of the interference-receiving station is moved in the process of specifying the reference level positions on the outermost side (e.g., the reference level positions of the low reference level). Then, for example, when specification of the reference level positions on the inner side (i.e., the reference level positions of the intermediate reference level or of the high reference level) is to be performed, the interference evaluation apparatus 1 sets the positions at which the values closest to the values of the desire reference level were obtained among the above-described stored values of the interference levels as the initial positions. Accordingly, the interference evaluation apparatus 1 can obtain the evaluation result of the desired areal interference evaluation with an even smaller calculation amount (i.e., the interference evaluation apparatus 1 can specify the ranges obtained based on the above-described three boundary lines with a smaller calculation amount).

Comparison with Conventional Technique

Hereinafter, a comparison between the interference evaluation according to the present embodiment and the interference evaluation according to a conventional technique will be described.

FIG. 12 is a diagram for illustrating a comparison between the interference evaluation according to the first embodiment of the present invention and the interference evaluation according to the conventional technique.

In FIG. 12, three interference evaluations are given as examples. One is an interference evaluation method performed by the interference evaluation apparatus 1 according to the present embodiment. The other two are interference evaluation methods performed according to conventional techniques. One of those two is an interference evaluation method (hereinafter referred to as "conventional technique A") in which the interference level is calculated for all squares of a map segmented in the form of a mesh. The other is an interference evaluation method (hereinafter referred to as "conventional technique B") in which the number of squares of a map segmented in the form of a mesh is adjusted to be less than 100 [squares] vertically×100 [squares] horizontally, and then the interference level is calculated for all squares.

Note that here, it is assumed that the map has been segmented into a mesh that has N [squares] vertically×N [squares] horizontally. That is, N is the number of positions to be subjected to interference evaluation. As shown in FIG. 12, in the case of the conventional technique A, the interference level is calculated for all squares, and therefore the calculation amount in the case where, for example, N=1,000 is satisfied is 1,000×1,000 (=1,000,000), and the calculation amount in the case where, for example, N=10,000 is satisfied is 10,000×10,000 (=100,000,000). That is, the conventional technique A is problematic in that the more the calculation accuracy is improved by dividing the mesh more finely, the more the calculation amount increases in proportion to the square of the number of squares on one side of the mesh.

On the other hand, in the conventional technique B, no matter the width of the target range of interference evaluation on the map, the calculation amount is adjusted to 100×100 (=10,000), and therefore the calculation amount can be kept constant. However, with the conventional technique B, the wider the target range of interference evaluation on the map is, the greater the size of each square in the mesh will also be. Accordingly, the conventional technique B is problematic in that the greater the size of each square is, the accuracy of the calculation result of the interference level decreases in inverse proportion to the size.

With respect to the above-described conventional technique A and conventional technique B, as described above, the interference evaluation apparatus 1 according to the present embodiment specifies the reference level positions based on the topography taken along cross-section lines that extend radially extending in all azimuths (360 degrees) centered about the position of the interfering station (or interference-receiving station). Then, the interference evaluation apparatus 1 performs evaluation of the areal interference evaluation based on the specified reference level positions and obtains a range influenced by interference.

As shown in FIG. 12, the calculation amount of the interference evaluation performed by the interference evaluation apparatus 1 according to the present embodiment can be expressed by $360 \times (1/\theta) \times k$. Here, $\theta$ indicates the angle between two adjacent cross-section lines that extend radially. Also, k indicates the number of instances until when the reference level position is specified due to the interference evaluation apparatus 1 dividing the segments between the interfering station and the interference-receiving station in two in the topographic profile.

Here, the correspondence between the positions of squares in the mesh segmenting the map and the positions of cross-section lines extending radially will be described with reference to FIG. 13.

Figure 13:
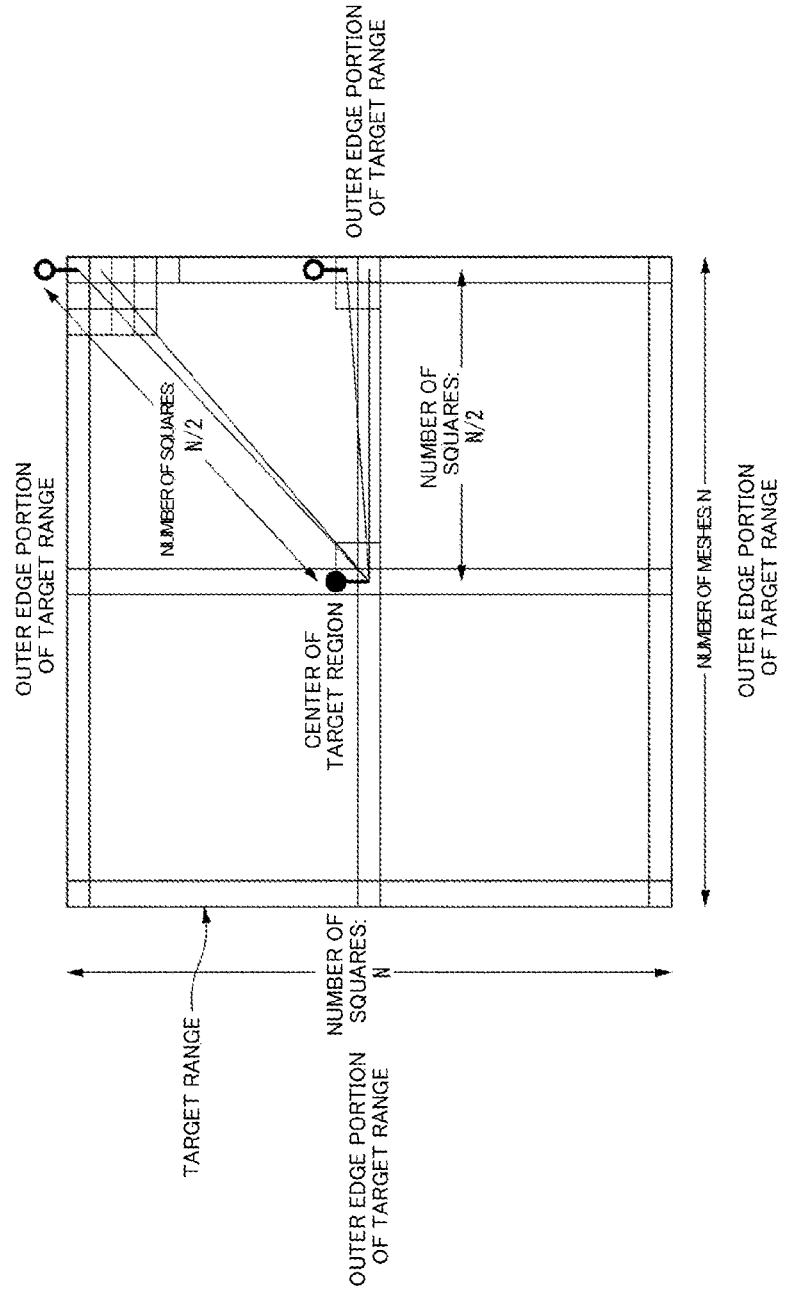
FIG. 13 is a diagram for illustrating correspondence between positions of squares in a mesh and positions of cross-section lines extending radially.

FIG. 13 is a diagram for illustrating the correspondence between positions of squares in a mesh and positions of a cross-section lines extending radially. For example, if the number of all squares in the mesh in the target range of interference evaluation is 1,000 [squares]×1,000 [squares], that is, if N=1,000 is satisfied, the number of squares on one side of the target range is 1,000 (=N), and therefore the total number of squares along the four sides, which are the outer edge portions of the target range, is approximately 4,000 (=4×N). More accurately, the number is 3,996. In this case, the angle between two adjacent cross-section lines extending radially is approximately $\theta \approx 0.1$ [degrees].

Also, since the number of squares from the center to the outer edge of the target range in any one direction radially is 500 (=N/2), the number of instances of calculation of the interference level performed in order to specify the reference level position while dividing the segment between the interfering station and the interference-receiving station into two is 9 instances or less (k≤9).

Accordingly, if $\theta=0.1$ [degrees] and k=9 are satisfied, the calculation amount calculated by $360 \times (1/\theta) \times k$ above is 32,400 (i.e., the number of instances of calculation of the interference level is approximately 32,400 instances). On the other hand, if N=1,000 is satisfied, the calculation amount in the conventional technique A is 1,000,000 as described above. In this manner, the interference evaluation apparatus 1 according to the present embodiment can significantly reduce the calculation amount to 3% of the calculation amount of the conventional technique.

Also, for example, if the number of all squares in the mesh in the target range of interference evaluation is 10,000 [squares]×10,000 [squares], that is, if N=10,000 is satisfied, the number of squares on one side of the target range is 10,000 (=N), and therefore the total number of squares along the four sides, which are the outer edge portions of the target range, is 40,000 (=4×N). More accurately, the number is 39,996. In this case, the angle between two adjacent cross-section lines extending radially is approximately $\theta \approx 00.1$ [degrees].

Also, since the number of squares from the center to the outer edge of the target range in any one direction radially is 5,000 (=N/2), the number of instances of calculation of the interference level performed in order to specify the reference level position while dividing the segment between the interfering station and the interference-receiving station in two is 13 instances or less (k13).

Accordingly, if e=0.01 [degrees] and k=13 are satisfied, the calculation amount calculated using $360 \times (1/\theta) \times k$ above is 468,000 (i.e., the number of instances of calculation of the interference level is approximately 468,000 instances). On the other hand, in N=10,000 is satisfied, the calculation amount in the conventional technique A is 100,000,000 as described above. In this manner, the interference evaluation apparatus 1 according to the present embodiment can significantly reduce the calculation amount to 0.5% of the calculation amount of the conventional technique.

In this manner, the interference evaluation apparatus 1 according to the present embodiment can significantly reduce the calculation amount while suppressing a decrease of the evaluation accuracy. Note that the above-described conventional technique B can be implemented relatively easily as interference calculation software (interference calculation tool). On the other hand, it can be said that the conventional technique A is not a practical interference evaluation method since the calculation amount is very large.

Overall Summary of Function of Interference Evaluation Apparatus

Hereinafter, an overall summary of the function of the interference evaluation apparatus 1 that can perform the above-described interference evaluation will be described.

Figure 14:
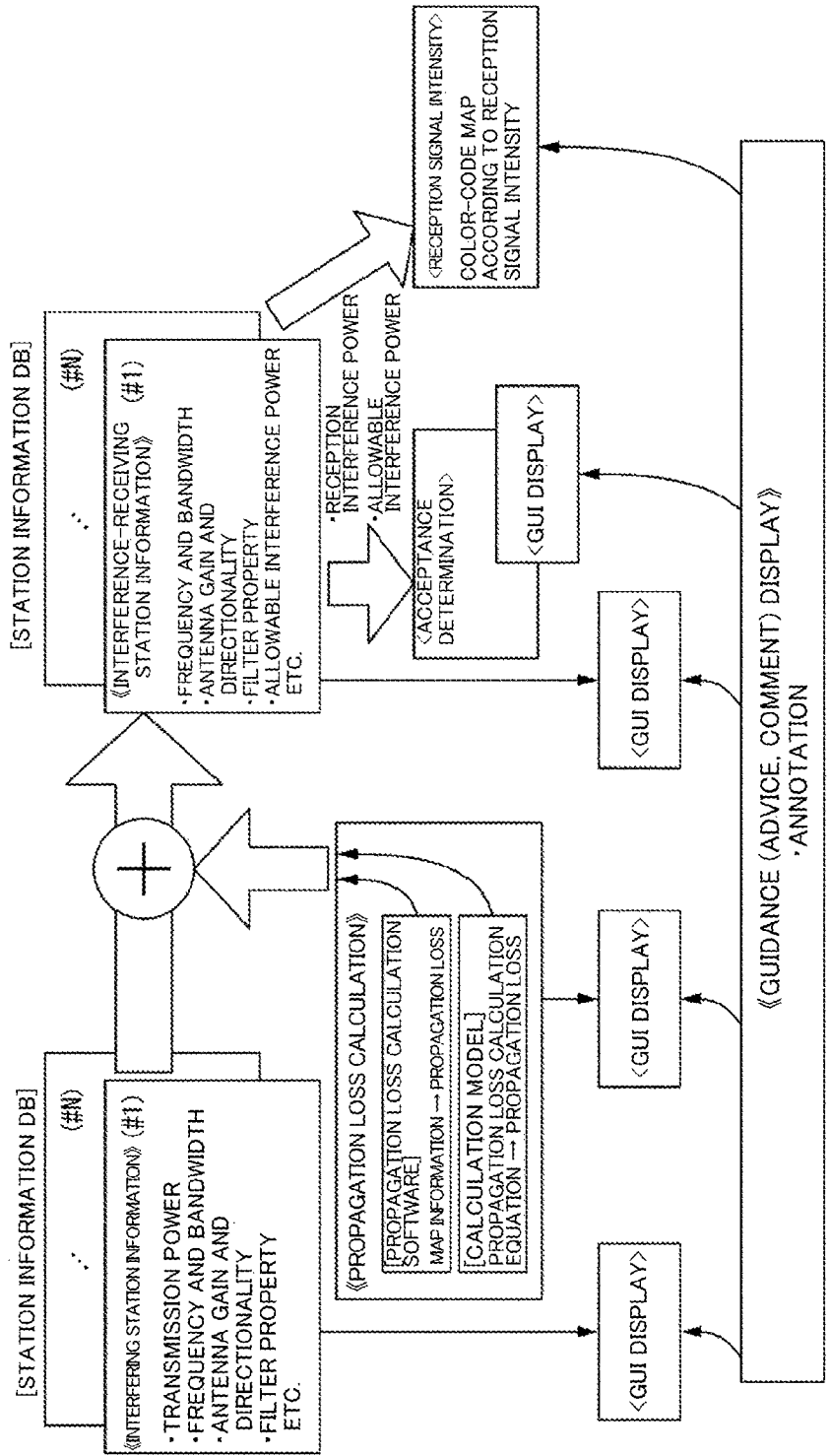
FIG. 14 is a schematic view showing an overall summary of functions of the interference evaluation apparatus 1 according to an embodiment of the present invention.

FIG. 14 is a schematic view showing an overall summary of functions of the interference evaluation apparatus 1 according to an embodiment of the present invention.

Main functions included in the interference evaluation apparatus 1 include a station information DB management function for storing multiple pieces of interfering station information and multiple pieces of interference-receiving station information in a database (hereinafter referred to as "DB") and managing the stored information. The interfering station information includes information indicating transmission power, frequency, bandwidth, antenna gain, filter property, and the like. Also, the interference-receiving station information includes information indicating frequency, bandwidth, antenna gain, filter property, allowable interference power, and the like.

Also, other main functions included in the interference evaluation apparatus 1 include a propagation loss calculation function for calculating propagation loss based on the interfering station information and the interference-receiving station information using propagation loss calculation software or a calculation model. The propagation loss software is software for calculating the propagation loss using map information. The calculation model is a model for calculating propagation loss based on a propagation loss calculation equation.

Also, other functions included in the interference evaluation apparatus 1 include an acceptance determination function for determining whether or not common use between the interfering station and the interference-receiving station is possible based on the calculation result obtained by the propagation loss calculation function, or a reception signal intensity output function for outputting information indicating a received signal intensity calculated using the calculation result obtained by the propagation loss calculation function.

Also, other functions included in the interference evaluation apparatus 1 include a GUI (Graphical User Interface) display function for displaying a display screen on which information to be used or generated by the above-described functions is represented visually. On a display screen for allowing selection of the interfering station information and the interference-receiving station information, which is displayed by the GUI display function, the desired interfering station information and interference-receiving station information are displayed such that they can be selected from among the interfering station information and the interference-receiving station information stored in the DB by the station information DB management function. The propagation loss calculation function uses the selected interfering station information and the interference-receiving station information in the propagation loss calculation.

Note that as shown in FIG. 14, there may also be a guidance (advice, comment) display function for displaying guidance (or advice or a comment) to a user on the display screens displayed by the GUI display function. The guidance (or advice or comment) is displayed in, for example, an annotation format.

Functional Configuration of Interference Evaluation Apparatus

Figure 15:
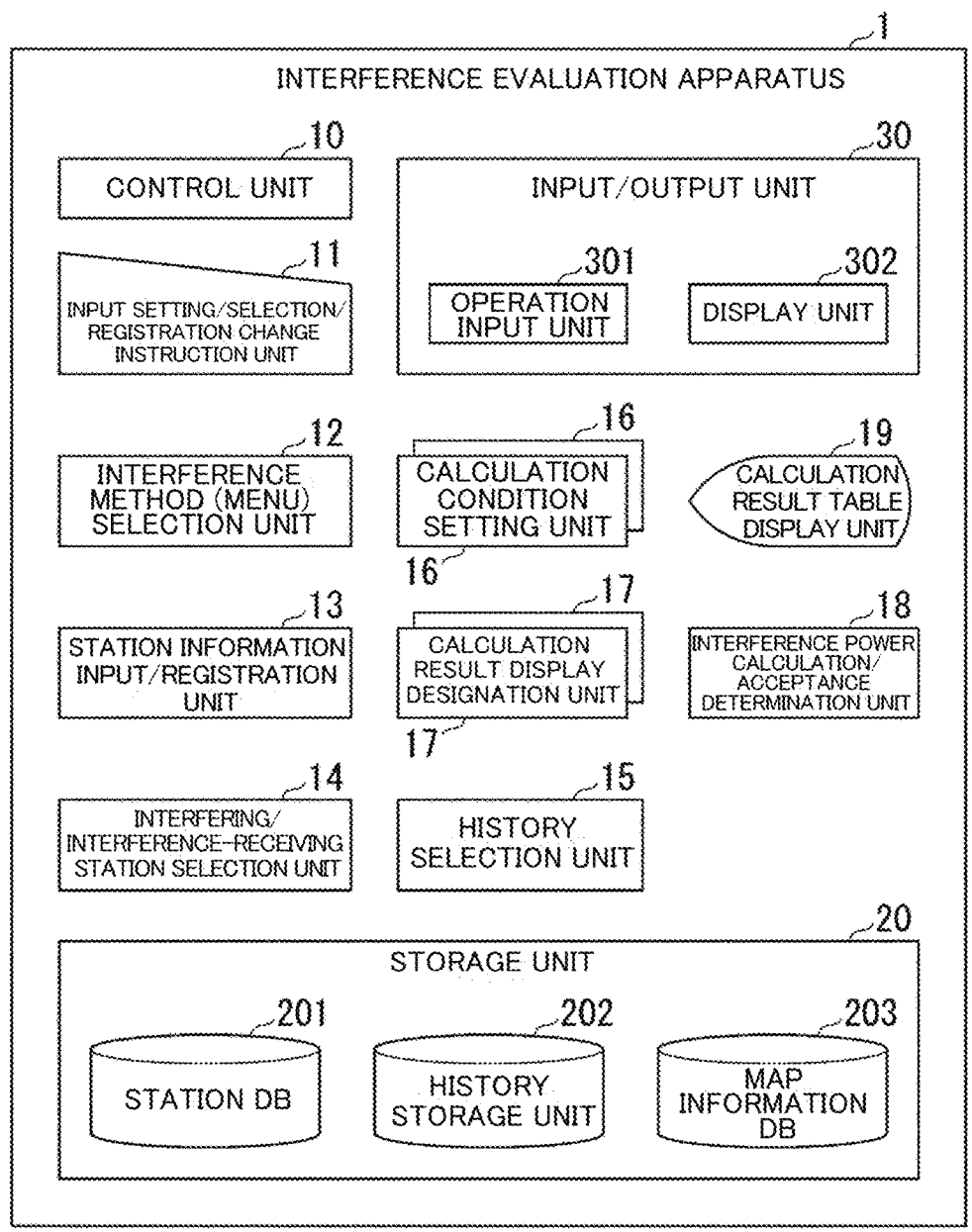
FIG. 15 is a block diagram showing a functional configuration of the interference evaluation apparatus 1 according to an embodiment of the present invention.

FIG. 15 is a block diagram showing a functional configuration of the interference evaluation apparatus 1 according to an embodiment of the present invention. As described above, the interference evaluation apparatus 1 is an apparatus for evaluating, over an area, radio-wave interference that occurs between a first radio station (interfering station or interference-receiving station) and a second radio station (interference-receiving station or interfering station).

As shown in FIG. 15, the interference evaluation apparatus 1 is constituted by including a control unit 10, an input setting/selection/registration change instruction unit 11, an interference method (menu) selection unit 12, a station information input/registration unit 13, an interfering/interference-receiving station selection unit 14, a history selection unit 15, at least one calculation condition setting unit 16, at least one calculation result display designation unit 17, an interference power calculation/acceptance determination unit 18, a calculation result table display unit 19, a storage unit 20, and an input unit 30.

The interference evaluation apparatus 1 is constituted by including an information processing apparatus, or for example, a general-purpose computer such as a personal computer, or a small-size information terminal such as a tablet terminal.

The control unit 10 controls the processing executed by the functional blocks of the interference evaluation apparatus 1. The control unit 10 is constituted by including a processor (e.g., a CPU (Central Processing Unit).

As shown in FIG. 15, the storage unit 20 includes a station DB 201, a history storage unit 202, and a map information DB 203. The storage unit 20 is constituted by including a storage medium (e.g., a magnetic disk, a semiconductor memory, or a combination of these storage mediums).

As shown in FIG. 15, the input/output unit 30 includes an operation input unit 301 and a display unit 302. The operation input unit 301 is constituted by including an input member that receives input of an operation performed by a user, or for example, a keyboard, a mouse, or the like. The display unit 302 is constituted by including an output member that displays a display screen to be presented to the user, or for example, a liquid crystal display. Note that the operation input unit 301 and the display unit 302 may also be constituted by one member (e.g., a touch panel) having an input/output function.

Note that the input setting/selection/registration change instruction unit 11, the interference method (menu) selection unit 12, the station information input/registration unit 13, the interfering/interference-receiving station selection unit 14, the history selection unit 15, the at least one calculation condition setting unit 16, the at least one calculation result display designation unit 17, the interference power calculation/acceptance determination unit 18, and the calculation result table display unit 19 may also be functions implemented by a software program executed by the control unit 10. In this case, for example, this software program is stored in the storage unit 20 and is read out and executed by the control unit 10.

The input setting/selection/registration change instruction unit 11 acquires information input from the operation input unit 301 through input of an operation performed by the user. The input setting/selection/registration change instruction unit 11 converts the information into an instruction indicating input setting, selection, registration change, or the like, which can be recognized by the functional blocks of the interference evaluation apparatus 1 and outputs the resulting instruction to the functional blocks. Specifically, for example, the input setting/selection/registration change instruction unit 11 converts the electrical signal input from the operation input unit 301 into input data to be input to the software program including the functional blocks of the interference evaluation apparatus 1.

The map information DB 203 is a database for storing map information. Map information in this context is information indicating, for example, altitudes and objects that are present (e.g., buildings, roads, rivers, etc.) for each position (e.g., latitude and longitude, or the like). The map information DB 203 is used to display the positions of the radio stations to be subjected to interference evaluation, interference evaluation results, and the like on the map.

Also, the map information DB 203 stores information indicating a topographic cross-section of each azimuth centered about the first radio station (interfering station or interference-receiving station).

The calculation result display designation unit 17 performs designation of how the calculation results of the interference evaluation and the like are to be displayed on the map displayed on the display unit 302 based on the instruction information input from the operation input unit 301, which indicates an instruction from the user.

The calculation result table display unit 19 displays the evaluation result of interference evaluation on the map displayed on the display unit 302 based on the designation performed by the calculation result display designation unit 17.

The history storage unit 202 accumulates information (hereinafter also referred to as "history information") indicating calculation conditions and evaluation results during interference evaluation on a radio station subjected to interference evaluation in the past. The history information stored in the history storage unit 202 is used in a new interference evaluation.

The history selection unit 15 performs designation regarding how to select and use the history information accumulated in the history storage unit 202 based on instruction information input from the operation input unit 301, which indicates an instruction from the user.

The station DB 201 (station information storage unit) is a database composed of information relating to the radio station subjected to the interference evaluation.

The interfering/interference-receiving station selection unit 14 (station information selection unit) selects information relating to a radio station, which was stored in the station DB 201, and allows the selected information to be used in the interference evaluation, based on the instruction information input from the operation input unit 301, which indicates an instruction from the user.

The station information input/registration unit 13 inputs the information relating to the radio station to the station DB 201 and causes the information to be registered, based on the instruction information input from the operation input unit 301, which indicates an instruction from the user.

The interference method (menu) selection unit 12 performs determination of the kind of interference evaluation to be performed based on the instruction information input from the operation input unit 301, which indicates an instruction from the user.

The calculation condition setting unit 16 sets the calculation condition of the interference evaluation for the interference method selected by the interference method (menu) selection unit 12. The calculation condition setting unit 16 can set the calculation condition for interference evaluation using the information relating to the radio station selected by the interfering/interference-receiving station selection unit 14.

Note that the above-described selection of the information of the radio station and setting of the calculation condition of the interference evaluation are performed via the input setting/selection/registration change instruction unit 11.

Also, the calculation condition setting unit 16 (distinguishing unit) acquires information indicating the topographic cross-section of each azimuth centered about the first radio station (interfering station or interference-receiving station), which is stored in the map information DB 203. Also, the calculation condition setting unit 16 distinguishes the topographic cross-sections obtained based on the acquired topographic profiles into segments with visibility from the position of the first radio station (interfering station or interference-receiving station) and segments with no visibility from the position of the first radio station (interfering station or interference-receiving station), and sets the result of distinguishing as the calculation condition for interference evaluation.

Also, the calculation condition setting unit 16 (distinguishing unit) distinguishes the segments with no visibility from the position of the first radio station (interfering station or interference-receiving station) based on the position of a ridge included in the topographic cross-section obtained based on the acquired topographic profile.

The interference power calculation/acceptance determination unit 18 performs calculation of the interference power and acceptance determination. When the interference power calculation/acceptance determination unit 18 performs instruction of the calculation execution via the input setting/selection/registration change instruction unit 11 after the selection of the information relating to the radio station to be subjected to evaluation and the setting of the calculation condition of the interference evaluation are performed by the calculation condition setting unit 16, the interference power calculation/acceptance determination unit 18 executes the calculation of the interference power. The interference power calculation/acceptance determination unit 18 performs the acceptance determination by comparing the value of the interference power obtained based on the result of calculating the interference power and the allowable value of interference. The acceptance determination in this context is a determination indicating whether or not the interfering station, which is the radio station to be subjected to evaluation, and the interference-receiving station, which is influenced by the interfering station, can be used in common.

Also, with respect to a segment distinguished as having visibility from the position of the first radio station (interfering station or interference-receiving station), the interference power calculation/acceptance determination unit (specification unit) specifies the position (reference level position) at which a desired interference amount (interference level) is reached based on the distance between the first radio station (interfering station or interference-receiving station) and the second radio station (interference-receiving station or interfering station). Also, with respect to a segment distinguished as having no visibility from the position of the first radio station (interfering station or interference-receiving station), the interference power calculation/acceptance determination unit 18 (specification unit) specifies the position (reference level position) at which the desired interference amount (interference level) is reached by evaluating the radio-wave interference for each square of the evaluation target region that has been segmented into squares (in the form of a mesh).

Also, the interference power calculation/acceptance determination unit 18 (specification unit) sets the position at a distance equal to the distance between the position (reference level position) at which the desired interference amount (interference level) is reached, which was specified in the evaluation of the radio-wave interference on the first topographic cross-section, and the first radio station (interference-receiving station or interfering station) as an initial position of position searching in the evaluation of the radio-wave interference on a second topographic cross-section that is adjacent to the first topographic cross-section. Then, the interference power calculation/acceptance determination unit 18 (specification unit) evaluates the radio-wave interference on the second topographic cross-section by starting searching from the initial position.

The calculation result display designation unit 17 accumulates information indicating the calculation result of the interference evaluation, which was output from the interference power calculation/acceptance determination unit 18, in the history storage unit 202, and displays the information on the map displayed on the display unit 302, as described above.

As described above, in some cases, there are multiple calculation condition setting units 16 and multiple calculation result display designation units 17. In this case, the multiple calculation condition setting units 16 and the multiple calculation result display designation units 17 have partially different functions from each other. The multiple calculation condition setting units 16 and the multiple calculation result display designation units 17 are selected and used according to the type of interference evaluation obtained based on the instruction information input from the operation input unit 301, which indicates an instruction from the user.

Hereinafter, a relationship between the overview of functions (hereinafter referred to as a "function overview") of the interference evaluation apparatus 1 described with reference to FIG. 14 and the functional configuration (hereinafter referred to as a "functional configuration") of the interference evaluation apparatus 1 described with reference to FIG. 15 will be described.

The station information DB management function for storing multiple pieces of interfering station information and multiple pieces of interference-receiving station information in a DB and managing the stored information in the above-described function overview corresponds to the station information input/registration unit 13 and the interfering/interference-receiving station selection unit 14 in the above-described functional configuration.

Also, the propagation loss calculation function for calculating propagation loss based on the interfering station information and the interference-receiving station information using the propagation loss calculation software or the calculation model in the above-described function overview corresponds to the at least one calculation condition setting unit 16 and a portion of the interference power calculation/acceptance determination unit 18 in the above-described functional configuration.

Also, the acceptance determination function for determining whether or not the interfering station and the interference-receiving station can be used together based on the calculation result obtained by the propagation loss calculation function in the above-described function overview corresponds to the result display function achieved by a portion of the interference power calculation/acceptance determination unit 18 and the calculation result display designation unit 17 in the above-described functional configuration.

Also, the reception signal intensity output function for outputting information indicating the reception signal intensity calculated according to the calculation result obtained by the propagation loss calculation function in the above-described function overview corresponds to the result display function achieved by a portion of the interference power calculation/acceptance determination unit 18 and the calculation result display designation unit 17 in the above-described functional configuration.

As described above, the interference evaluation apparatus 1 according to the first embodiment of the present invention is an interference evaluation apparatus that evaluates, over an area, radio-wave interference that occurs between a first radio station and a second radio station. The interference evaluation apparatus 1 includes the calculation condition setting unit 16 (distinguishing unit) that acquires information indicating topographic cross-sections for respective azimuths centered about the first radio station and distinguishes the topographic cross-sections into segments with visibility from the position of the first radio station and segments with no visibility from the position of the first radio station. Also, the interference evaluation apparatus 1 includes the interference power calculation/acceptance determination unit 18 (specification unit) that specifies, with respect to the segment distinguished as having visibility from the position of the first radio station, a position (reference level position) at which the desired interference amount is reached based on the distance between the first radio station and the second radio station, and specifies, with respect to a segment distinguished as having no visibility from the position of the first radio station, a position (reference level position) at which the desired interference amount is reached by evaluating the radio-wave interference for each square of the evaluation target region segmented into squares.

By including the above-described configuration, the interference evaluation apparatus 1 according to the first embodiment of the present invention can reduce the calculation amount while maintaining the accuracy of interference evaluation.

Second Embodiment

Hereinafter, interference evaluation performed by an interference evaluation apparatus 1 according to a second embodiment of the present invention will be described with reference to the drawings.

Figure 16:
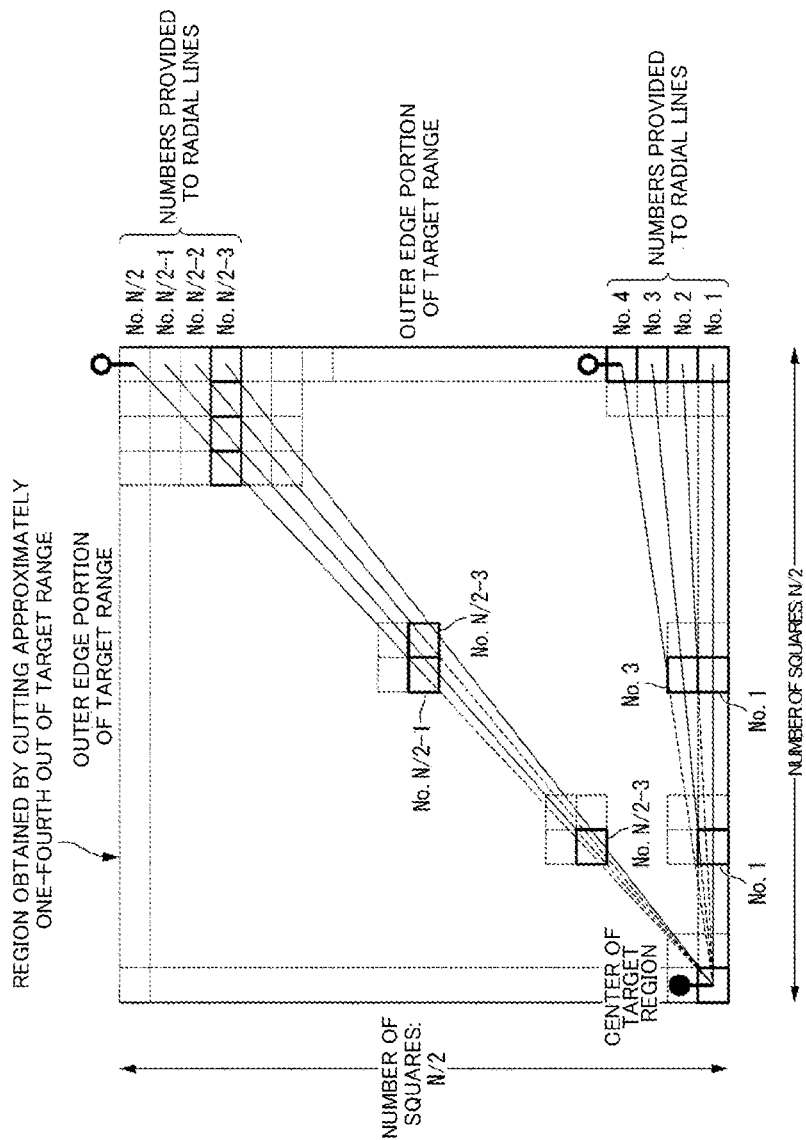
FIG. 16 is a diagram for illustrating correspondence between positions of squares in a mesh and positions of cross-section lines extending radially.

FIG. 16 is a diagram for illustrating correspondence between positions of squares in a mesh and positions of cross-section lines extending radially. Note that FIG. 16 indicates a region obtained by cutting out a range on the upper-right that is approximately one-fourth of the target range of interference evaluation centered about the position of the interfering station, as shown in FIG. 13, for example.

As shown in FIG. 16, in the region of the outer edges of the target range, the cross-section lines extending radially and the squares in the mesh are in one-to-one correspondence with each other. On the other hand, in the center of the target range, the cross-section lines in the form of multiple radial lines overlap in one square. This means that a case may occur in which calculation of an interference level is performed redundantly for the same position (square). In order to avoid such a redundancy, in the second embodiment described hereinafter, more calculation of the interference level is omitted the closer a region is to the center of the target range.

In the region obtained by cutting out the upper-right portion that is approximately one-fourth of the target range of the interference evaluation shown in FIG. 16, the number of squares in the mesh is N/2 squares vertically and horizontally. Also, the position of the lower-left corner of the region (i.e., the position of the center of the target range) is the position of the interfering station. On the other hand, the outer edge portion on the upper side and the outer edge portion on the right side of the region are outer edge portions of the target range of the interference evaluation.

The interference evaluation apparatus 1 provides numbers (hereinafter referred to as "direction numbers") to the above-described cross-section lines extending radially, which are to be used in the interference evaluation. That is, as shown in FIG. 16 for example, the interference evaluation apparatus 1 provides the direction number "No. 1" to the cross-section line extending radially that extends in the direction of the square in the lower-right corner, and provides direction numbers in sequence up to the cross-section line extending in the direction of the square in the upper-right corner. In this case, the direction number provided to the cross-section line extending in the direction of the square in the upper-right corner is "No. N/2". Furthermore, the interference evaluation apparatus 1 provides the direction numbers in sequence from the cross-section line extending in the direction of the square in the upper-right corner to the cross-section line extending in the direction of the square in the upper-left corner.

As shown in FIG. 12, for example, the direction numbers to be provided are, in sequence starting from the line extending in the direction of the square in the lower-right corner, "No. 1" (direction of lower-right corner), "No. 2", "No. 3", "No. 4", . . . , "No. N/2-3", No. N/2-2", No. N/2-1", "No. N/2" (direction of upper-right corner), . . . , "No. N-4", "No. N-3", "No. N-2", and "No. N-1" (direction of upper-left corner).

As shown in FIG. 16, in the outer edge portions of the target range of interference evaluation, the cross-section lines (cross-section lines to which direction numbers are provided in the order "No. 1", "No. 2", . . . ) extending radially and the squares are in one-to-one correspondence with each other.

Also, at the positions near the middle between the outer edge portions of the target range and the center of the target range, approximately two cross-sectional lines extending radially and one square are in correspondence with each other. For example, one square corresponds to the cross-section line to which the direction number "No. 1" is provided and the cross-section line to which the direction number "No. 2" is provided, and one square corresponds to the cross-section line to which the direction number "No. 3" is provided and the cross-section line to which the direction number "No. 4" is provided. Similarly, one square corresponds to the cross-section line to which the direction number "No. N/2-3" is provided and the cross-section line to which the direction number "No. N/2-2" is provided, and one square corresponds to the cross-section line to which the direction number "No. N/2-1" is provided and the cross-section line to which the direction number "No. N/2" is provided.

That is, at the positions near the middle between the outer edge portions of the target range and the center of the target range, the cross-section lines extending radially and the squares are in two-to-one correspondence with each other. Regarding this kind of position near the middle between the outer edge portions of the target range and the center of the target range, the interference evaluation apparatus 1 according to the present embodiment performs calculation of the interference level only if the interference evaluation is to be performed on the cross-sectional lines that extend radially and to which odd direction numbers have been provided.

On the other hand, the interference evaluation apparatus 1 omits calculation of the interference level if interference evaluation is performed on cross-section lines that extend radially and to which even direction numbers have been provided. Also, the interference evaluation apparatus 1 re-uses the values of the interference levels calculated in the interference evaluation on the cross-section lines that extend radially and to which the above-described odd direction numbers have been provided. Accordingly, the interference evaluation apparatus 1 according to the present embodiment can omit calculation of approximately half of the interference levels at positions near the middle between the outer edge portions of the target range and the center of the target range.

Note that the operation of the interference evaluation apparatus 1 in the case where the direction number is odd and the operation of the interference evaluation apparatus 1 in the case where the direction number is even may also be the inverse operations. That is, the interference evaluation apparatus 1 may also have a configuration in which the calculation of the interference level is performed if the direction number is even and the calculation of the interference level is omitted if the direction number is odd.

Furthermore, if the distance from the center of the target range to the outer edge portion of the target range is considered to be 1, in the vicinity of the position that is approximately one-fourth the distance from the center of the target range, approximately four cross-section lines extending radially and one square are in correspondence with each other. For example, one square corresponds to the cross-section lines to which the direction numbers "No. 1", "No. 2", "No. 3", and "No. 4" are provided, and one square corresponds to the cross-section lines to which the direction numbers "No. N/2-3", "No. N/2-2", "No. N/2-1", and "No. N/2" are provided.

That is, the cross-section lines extending radially and the squares are in four-to-one correspondence with each other in the vicinity of a position that is approximately one-fourth the distance from the center of the target range. In the vicinity of the position that is approximately one-fourth the distance from the of the target range, the interference evaluation apparatus 1 according to the present embodiment performs the calculation of the interference level only if the interference evaluation is to be performed on the cross-section lines that extend radially and to which direction numbers whose remainders are 1 when multiplied by 4 have been provided.

On the other hand, the interference evaluation apparatus 1 omits the calculation of the interference level if the interference evaluation is to be performed on the cross-section lines that extend radially and to which direction numbers whose remainders are not 1 when multiplied by 4 have been provided. Then, the interference evaluation apparatus 1 re-uses the values of the interference levels calculated in the interference evaluation performed on the cross-section lines that extend radially and to which direction numbers whose remainders are 1 when multiplied by 4 have been provided. Accordingly, the interference evaluation apparatus 1 according to the present embodiment can omit the calculation of approximately three-fourths of the interference levels in the vicinity of the position that is approximately one-fourth the distance from the center of the target range (to the outer edge portion).

Operations of Interference Evaluation Apparatus

Figure 17:
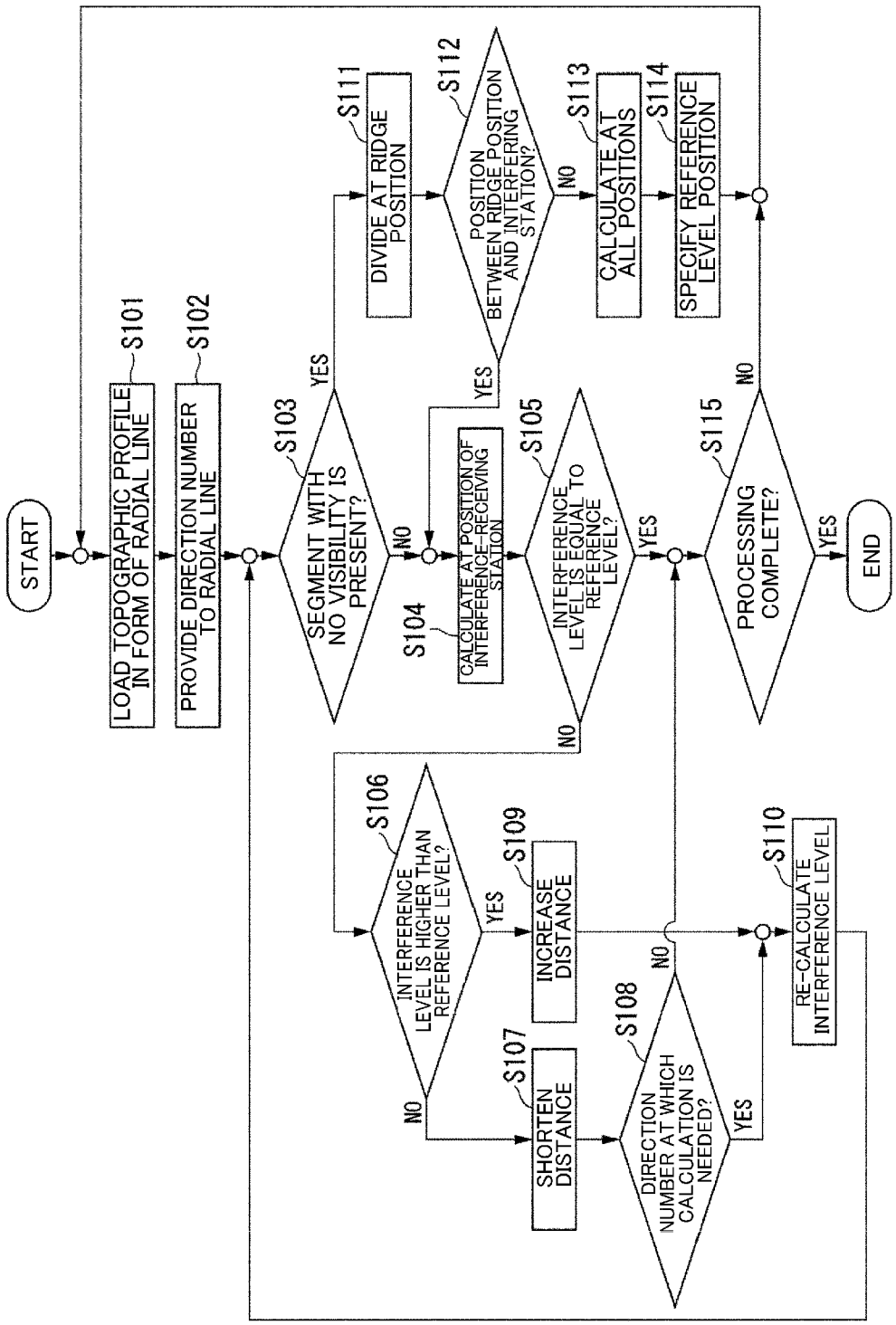
FIG. 17 is a flowchart showing an example of operations performed by the interference evaluation apparatus 1 according to a second embodiment of the present invention.

FIG. 17 is a flowchart showing an example of operations of the interference evaluation apparatus 1 according to the second embodiment of the present invention. The flowchart shown in FIG. 17 differs from the flowchart shown in FIG. 2 (first embodiment) in which the operation in step S102 and the operation in step S108 have been added. On the other hand, as will be described specifically later, FIGS. 17 and 2 are the same in that step S101 corresponds to step S001 and the same functions and operations are performed therein. Similarly, step S103 corresponds to step S002 and step S104 corresponds to step S003. Also, step S105 corresponds to step S004, step S106 corresponds to step S005, step S107 corresponds to step S006, and step S110 corresponds to step S008. Furthermore, step S111 corresponds to step S009, step S112 corresponds to step S010, step S113 corresponds to step S011, step S114 corresponds to step S012, and step S115 corresponds to step S013.

The interference evaluation apparatus 1 loads one topographic profile taken along a cross-sectional line extending radially (step S101).

The interference evaluation apparatus 1 provides a number to the loaded cross-section line extending radially (step S102). The interference evaluation apparatus 1 analyzes the loaded topographic profile and determines whether or not there is visibility between the interfering station and the interference-receiving station (step S103).

If there is visibility in all segments between the interfering station and the interference-receiving station in the loaded topographic profile (step S103: No), the interference evaluation apparatus 1 calculates the interference level at the position of the interference-receiving station (step S104). The interference evaluation apparatus 1 determines whether or not the calculated interference level is equal to a predetermined reference level (e.g., whether or not the calculated interference level is within the range of a predetermined reference level).

If the interference level and the reference level are not equal to each other (step S105: No) and the interference level is lower than the reference level (step S106: No), the interference evaluation apparatus 1 moves the position of the interference-receiving station closer to the position of the interference-receiving station by an amount corresponding to half the distance moved previously (step S107). The interference evaluation apparatus 1 determines whether or not calculation of the interference level is needed (i.e., whether or not calculation of the interference level can be omitted) based on the direction number provided to the cross-section line extending radially (step S108).

If it has been determined that calculation of the interference level is needed (step S108: Yes), the interference evaluation apparatus 1 continues the interference evaluation. On the other hand, if it is determined through this determination that the calculation of the interference level is not needed (step S108: No), the interference evaluation apparatus 1 transitions to interference evaluation on the next topographic profile (taken along the adjacent cross-section line extending radially).

On the other hand, if the interference level is not equal to the reference level (step S105: No) and the interference level is higher than the reference level (step S106: Yes), the interference evaluation apparatus 1 moves the position of the interference-receiving station away from the position of the interfering station by an amount corresponding to half the distance moved previously (step S109).

Then, the interference evaluation apparatus 1 performs re-calculation of the interference level (step 110). The interference evaluation apparatus 1 repeats the operation of above-described step S103 and onward, and specifies the reference level positions at which the reference level is at a predetermined reference level, or for example, in a range of a predetermined reference level, by moving the position of the interference-receiving station.

On the other hand, if there is a segment in which there is no visibility among the segments between the interfering station and the interference-receiving station in the loaded topographic profile (step S103: Yes), the interference evaluation apparatus 1 divides the segments between the interfering station and the interference-receiving station using a ridge position in the topographic profile (step S111). Then, the interference evaluation apparatus 1 performs different analyses on multiple divided segments and specifies respective reference level positions.

The position between the ridge position and the interfering station is a segment that has visibility. Accordingly, if the position of the interference-receiving station is a position between the ridge position and the interfering station (step S112: Yes), the interference evaluation apparatus 1 performs operations that are the same as the operations of above-described step S104 and onward. On the other hand, a position that is not between the ridge position and the interfering station is a segment that does not have visibility. If the position of the interference-receiving station is a position that is not between the ridge position and the interfering station (step S112: No), the interference evaluation apparatus 1 performs calculation of the interference levels for all positions in the segment, that is, all squares in the segmented mesh (step S113). Then, the interference evaluation apparatus 1 specifies the reference level position (step S114).

The interference evaluation apparatus 1 performs the above-described processing in sequence on all of the topographic profiles, and if the processing performed on all of the topographic profiles is complete (step S115: Yes), the operation is ended. With that, the operation of the interference evaluation apparatus 1 indicated by the flowchart of FIG. 17 ends.

Specifically, in the case where the interference-receiving station has been moved in the direction of the interfering station, that is, in the direction of the center of the target range, to a position located at half the distance from the interfering station to the interference-receiving station using, for example, the first instance of calculation of the interference level for a certain topographic profile, if the direction number provided to the cross-section line that extends radially and is to be subjected to the interference evaluation is odd, the interference evaluation apparatus 1 continues the interference evaluation. On the other hand, if the direction number is even, the calculation of the interference level is omitted, and the interference evaluation performed on the topographic profile taken along the next adjacent cross-section line that extends radially is transitioned to.

Also, in the case where the interference evaluation is continued in the above description and the interference-receiving station has been moved to a position located at one-fourth the distance from the interfering station to the interference-receiving station in the direction of the interfering station, that is, in the direction of the center of the target range, using the calculation of the second interference level, if the remainder is 1 when the direction number provided to the cross-section line that extends radially and is the target of interference evaluation, is multiplied by 4, the interference evaluation apparatus 1 continues the interference evaluation. On the other hand, if the remainder is not 1 when the direction number is multiplied by 4, the calculation of the interference level is omitted, and interference evaluation on the topographic profile taken along the next adjacent cross-section line extending radially is transitioned to.

Furthermore, in the case where the interference evaluation is continued in the above description and the interference-receiving station has been moved to a position that is one-$2^n$-th of the distance from the interfering station to the interference-receiving station in the direction of the interfering station, that is, in the direction of the center of the target range according to the calculation of the n-th interference level, if the remainder is 1 when the direction number provided to the cross-section line that extends radially and is the target of the interference evaluation is multiplied by $2^n$, the interference evaluation apparatus 1 continues the interference evaluation. On the other hand, if the remainder is not 1 when the direction number is multiplied by $2^n$, the calculation of the interference level is omitted, and interference evaluation on the topographic profile taken along the next adjacent cross-section line extending radially is transitioned to.

In this manner, due to the operation in step S102 and the operation in step S108 being added, the interference evaluation apparatus 1 according to the second embodiment can perform interference evaluation with an even smaller calculation amount compared to the above-described first embodiment.

In this manner, a number provision step of respectively providing direction numbers to the azimuths centered about the first radio station (interfering station or interference-receiving station) is further included in the operations performed by the interference evaluation apparatus 1 according to the second embodiment of the present invention. Also, the operation includes a step of, if the radio-wave interference is to be evaluated for each square of the evaluation target region that has been segmented into squares (in the form of a mesh), evaluating the radio-wave interference only on the squares distinguished as evaluation targets based on the direction numbers and the distance from the first radio station (interfering station or interference-receiving station). Accordingly, the calculation amount is reduced while maintaining the accuracy of the interference evaluation.

Third Embodiment

Hereinafter, interference evaluation performed by an interference evaluation apparatus 1 according to a third embodiment of the present invention will be described with reference to the drawings.

In the above-described second embodiment, the interference evaluation apparatus 1 had a configuration in which it is determined whether or not the calculation of the influence level is needed only if there is no segment with no visibility (i.e., only if the segment has visibility), and the calculation of the interference level is omitted depending on the determination result. On the other hand, in the third embodiment described hereinafter, the interference evaluation apparatus 1 is configured to operate similarly to that of the above-described second embodiment if there is no segment with no visibility, and even if there is a segment with no visibility, the interference evaluation apparatus 1 determines whether or not the calculation of the interference level is needed, and omits the calculation of the interference level depending on the determination result.

Operations of Interference Evaluation Apparatus

Figure 18:
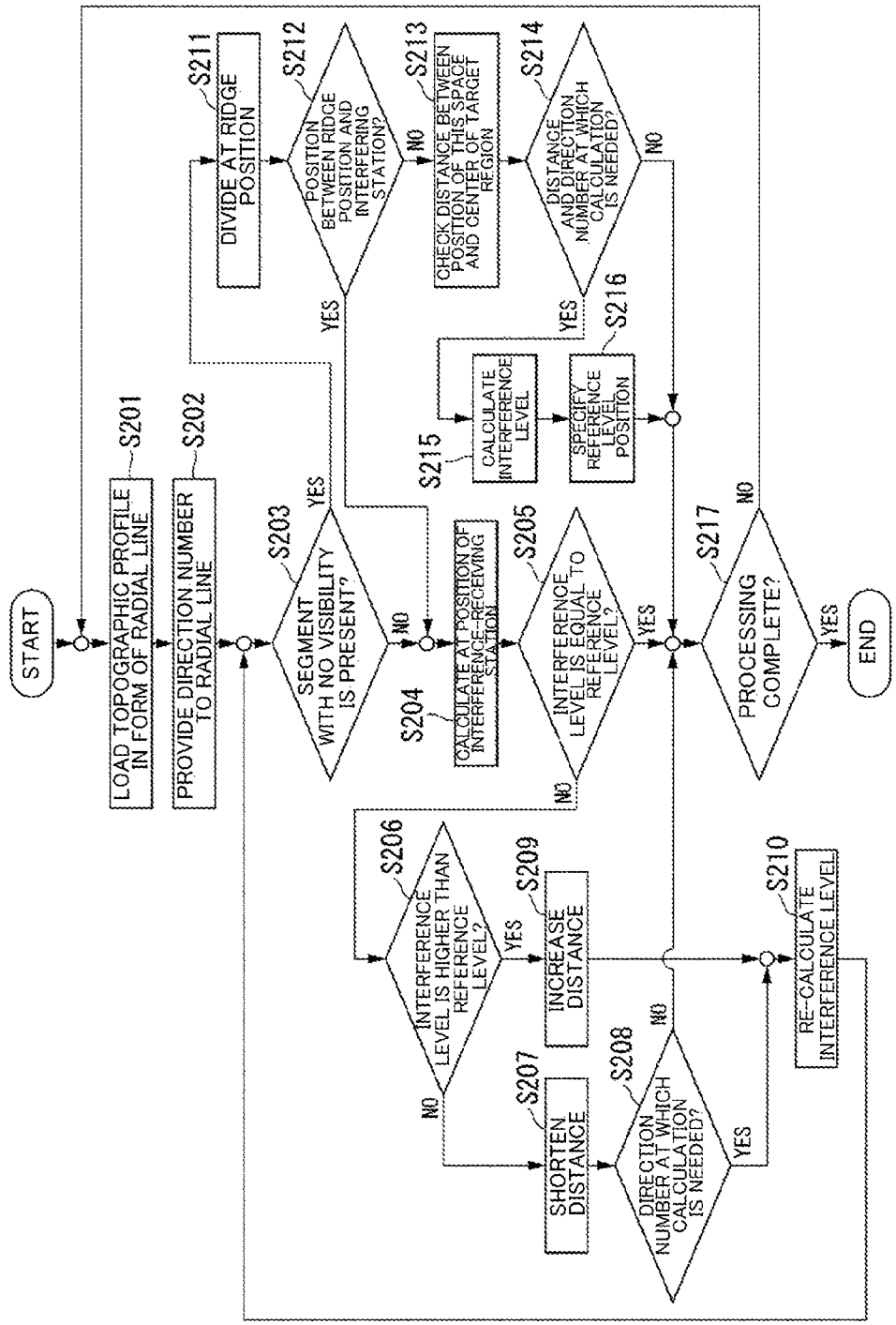
FIG. 18 is a flowchart showing an example of operations performed by an interference evaluation apparatus 1 according to a third embodiment of the present invention.

FIG. 18 is a flowchart showing an example of operations of the interference evaluation apparatus 1 according to the third embodiment of the present invention. The flowchart shown in FIG. 18 differs from the flowchart (second embodiment) shown in FIG. 17 in that the operations of steps S213 to S215 have been added. In FIG. 18, which will be described specifically hereinafter, steps S201 to S210 correspond to and are the same as steps S101 to S110 in FIG. 17. Similarly, step S211 corresponds to step S111 and step S212 corresponds to step S112. Also, step S215 corresponds to a portion of step S113. Furthermore, step S216 corresponds to step S114 and step S217 corresponds to step S115.

The interference evaluation apparatus 1 loads one topographic profile taken along a cross-sectional line extending radially (step S201).

The interference evaluation apparatus 1 provides the numbers to the loaded cross-section line extending radially (step S202). The interference evaluation apparatus 1 analyzes the loaded topographic profile and determines whether or not there is visibility between the interfering station and the interference-receiving station (step S203).

If there is visibility in all of the segments between the interfering station and the interference-receiving station in the loaded topographic profile (step S203: No), the interference evaluation apparatus 1 calculates the interference level at the position of the interference-receiving station (step S204). The interference evaluation apparatus 1 determines whether or not the calculated interference level is equal to a predetermined reference level, or for example, whether or not the calculated interference level is within the range of a predetermined reference level.

If the interference level is not equal to the reference level (step S205: No) and the interference level is lower than the reference level (step S206: No), the interference evaluation apparatus 1 moves the position of the interference-receiving station closer in the direction of the interfering station by an amount corresponding to half the distance it was moved before on the topographic profile (step S207). The interference evaluation apparatus 1 determines whether or not the calculation of the interference level is needed, that is, whether or the calculation of the interference level can be omitted, based on the direction number provided to the cross-section line extending radially (step S208).

If it has been determined that calculation of the interference level is needed (step S208: Yes), the interference evaluation apparatus 1 continues the interference evaluation. On the other hand, if it has been determined that the calculation of the interference level is not needed (step S208: No), the interference evaluation apparatus 1 transitions to interference evaluation for the next topographic profile (taken along an adjacent cross-section line extending radially).

On the other hand, if the interference level is not equal to the reference level (step S205: No) and the interference level is higher than the reference level (step S206: Yes), the interference evaluation apparatus 1 moves the position of the interference-receiving station away from the direction of the interfering station by an amount corresponding to half the distance it was moved before (step S209).

Then, the interference evaluation apparatus 1 performs re-calculation of the interference level (step 210). The interference evaluation apparatus 1 repeats the operation of above-described step S203 and onward, and specifies the reference level positions at which the reference level is at a predetermined reference level, or for example, in a range of a predetermined reference level, by moving the position of the interference-receiving station.

On the other hand, if there is a segment with no visibility among the segments between the interfering station and the interference-receiving station in the loaded topographic profile (step S203: Yes), the interference evaluation apparatus 1 divides the segments between the interfering station and the interference-receiving station using the ridge position in the topographic profile (step S211). Then, the interference evaluation apparatus 1 performs different analyses on the multiple divided segments and specifies respective reference level positions.

The position between the ridge position and the interfering station is a segment that has visibility. Accordingly, if the position of the interference-receiving station is a position between the ridge position and the interfering station (step S212: Yes), the interference evaluation apparatus 1 performs operations that are the same as the operations of above-described step S204 and onward. On the other hand, a position that is not between the ridge position and the interfering station is a segment that does not have visibility. If the position of the interfering station is a position that is not between the ridge position and the interfering station (step S212: No), the interference evaluation apparatus 1 checks the distance from the center of the target range of interference evaluation and the direction number provided to the cross-section line extending radially (step S213), and determines whether or not the calculation of the interference level is needed according to the result of the checking (step S214).

Then, if it is determined that the calculation is needed (step S214: Yes), the interference evaluation apparatus 1 performs calculation of the interference level (step S215) and specifies the reference level position (step S216). On the other hand, if it has been determined that the calculation is not needed (step S214: No), the interference evaluation apparatus 1 omits the calculation of the interference level and transitions to the interference evaluation for the next topographic profile (taken along an adjacent cross-section line extending radially).

The interference evaluation apparatus 1 performs the above-described processing in sequence on all of the topographic profiles, and if the processing performed on all of the topographic profiles is complete (step S217: Yes), the operation is ended. With that, the operation of the interference evaluation apparatus 1 indicated by the flowchart of FIG. 18 ends.

Note that in the determination of whether or not the calculation of the interference level is needed in step S214, the determination is performed based on the direction number provided to the cross-section line extending radially, similarly to the above-described determination performed in the case where there is no segment with no visibility (e.g., step S208). Furthermore, in the determination performed in step S214, the determination is performed based on the result of checking the distance obtained in step S213. The checking of the distance is checking where in the target range of the interference evaluation the position of the interference-receiving station that performs interference evaluation at that time is.

More specifically, it is checking where the position of the interference-receiving station is between center of the target range and the outer edge portion of the target range, as shown in FIG. 13. For example, if the position of the interference-receiving station is a position near the middle between the center of the target range and the outer edge portion of the target range, the interference evaluation apparatus 1 sets half as targets of calculation of the interference level and sets the other half as targets for omitting the calculation of the interference level, based on whether the direction numbers provided to the cross-section lines extending radially, that is, the direction numbers, are odd or even. Also, for example, if the position of the interference-receiving station is a position that is closer to the center of the target range in a 1:3 proportion between the center of the target range and the outer edge portion of the target range, the interference evaluation apparatus 1 sets one-fourth as targets of calculation of interference levels and sets the remaining three-fourths as targets for omitting the calculation of the interference levels based on the direction numbers provided to the cross-section lines extending radially, or for example, based on whether or not the remainder is 1 when the direction numbers are multiplied.

Fourth Embodiment

Hereinafter, interference evaluation performed by an interference evaluation apparatus according to a fourth embodiment of the present invention will be described with reference to the drawings.

The above-described first to third embodiments described operations for evaluation the influence of areal interference and a configuration for reducing the number of instances of performing calculation of the interference level (calculation amount) while maintaining the calculation accuracy in the interference evaluation. The fourth embodiment described hereinafter will describe a configuration for performing interference evaluation with consideration given to a condition (antenna direction or the like) set in advance when evaluating the influence of areal interference.

For example, the antenna direction of the interfering station and the interference-receiving station is one example of a condition that is given consideration when evaluating the influence of the interference. Note that if a non-directional antenna is used, there is no need to consider the antenna direction. However, in general, in many cases in which the influence of interference is evaluated, directional antennas are often used in interfering station and interference-receiving stations. In the fourth embodiment, the antenna direction of the interfering station and the interference-receiving station are set conditions in the case of performing areal interference evaluation.

Note that in general, with software for performing interference evaluation, for example, there is a screen for designating interference evaluation execution conditions, as shown in FIG. 19.

FIG. 19 is a schematic diagram showing an example of an execution condition designation screen displayed by the interference evaluation apparatus 1 according to the fourth embodiment of the present invention. An execution condition designation screen hs shown in FIG. 19 is an example of a screen for setting an execution condition for interference evaluation performed through areal calculation.

Note that in FIG. 19, areal calculation is selected due to "areal calculation" being checked using a radio button in an item for designating "calculation method". As described above, in areal calculation, the position of one radio station (e.g., the interference-receiving station) among the position of the interfering station and the position of the interference-receiving station is fixed and a range is used to indicate the area (range) in which the other radio station (e.g., the interfering station) is influenced by interference. Specifically, the range designated by the surrounding area of the former radio station (e.g., interference-receiving station) is segmented in the form of a mesh (squares), and the interference calculation is performed over an area assuming that the latter radio station (e.g., interfering station) is present in each mesh. Accordingly, the range in which the former radio station (e.g., the interference-receiving station) is influenced by the interference is determined.

As shown in FIG. 19, a list of station information of the interfering station and station information of the interference-receiving station that were selected as targets of interference evaluation is displayed in the display field "interfering/interference-receiving information" on the execution condition designation screen hs. In the station information displayed in this list, "int./rec.", which is an item for distinguishing whether the station is an interfering station or an interference-receiving station, "station name", "latitude 1" and "longitude 1", which indicate the position at which the radio station is installed, "system name", which indicates the name of the radio system used in the radio station, and "antenna name", which indicates the name of the antenna used in the radio station, are displayed.

Also, as shown in FIG. 19, in addition to the items for setting whether or not there is consideration of attenuation and loss (i.e., checkboxes for selecting whether or not the three items "attenuation due to topography", "attenuation due to buildings", and "additional loss" are to be given consideration as execution conditions for interference evaluation), the item "area designation" (range designation using latitude and longitude) for designating the area in which interference evaluation is to be executed, and the item "interfering station antenna direction" are displayed on the bottom portion of the execution condition designation screen hs.

If "worst" (i.e., worst condition) has been set in the item "interfering station antenna direction", interference evaluation is performed for the case where the antenna direction of the interfering station always faces the interference-receiving station. When the antenna of the interfering station faces the interference-receiving station, the interference level is at its highest.

Also, in the item "interfering station antenna direction", the interference level can also be calculated by designating the antenna direction of the interfering station using east, west, north, and south or designating the antenna direction so as to always be at a certain angle with respect to the direction of the interference-receiving station. As shown in FIG. 19, the "interfering station antenna angle" is selected using a radio button.

Note that a horizontal angle and an elevation angle may also be set regarding the antenna direction in the item "interfering station antenna direction", although this is not shown in FIG. 19.

Figure 20:
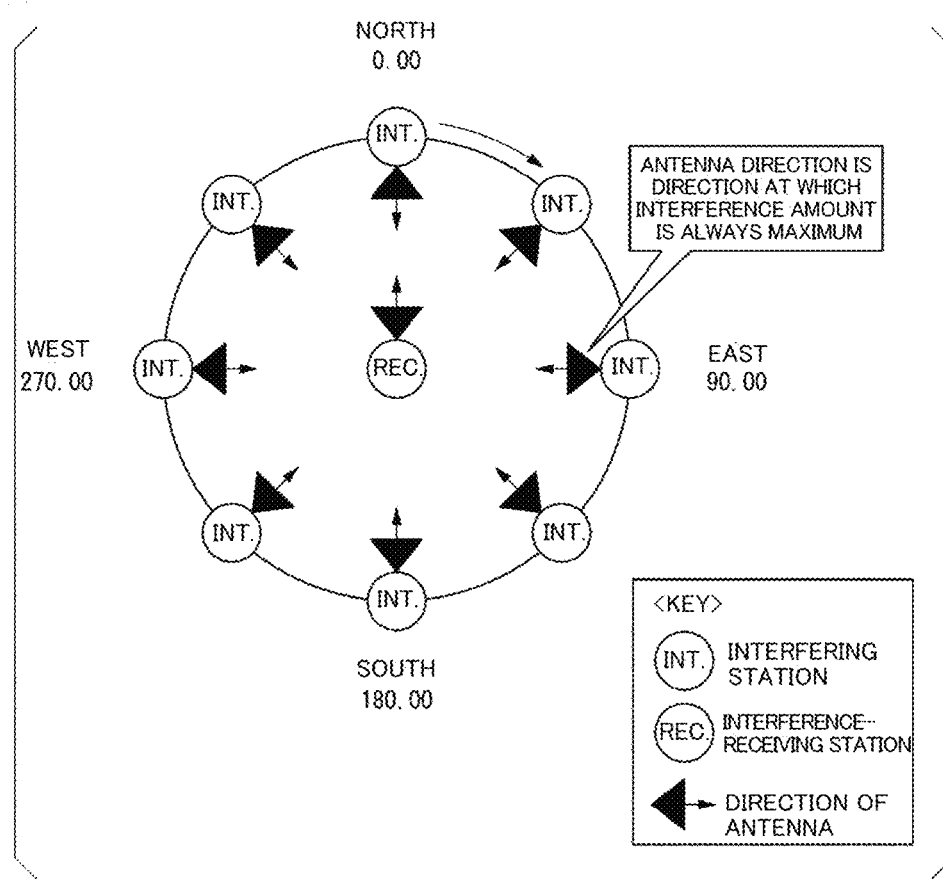
FIG. 20 is a diagram showing an antenna direction in a case where "worst" has been designated as the antenna direction in areal interference evaluation.

FIG. 20 is a diagram showing an antenna direction in the case where "worst" has been designated as the antenna direction in areal interference evaluation. Here, if the position of the interference-receiving station is known and the position of the interfering station has not been decided, the interference evaluation apparatus 1 evaluates, over an area, the influence of interference from the interfering station on the interference-receiving station in the designated target range of interference evaluation.

For example, if "worst" has been designated as the set condition of the antenna direction of the interfering station in the execution condition designation screen hs shown in FIG. 19, the interference evaluation apparatus 1 calculates the interference level assuming that the antenna direction of the interfering station always faces the direction of the interference-receiving station. For this reason, in this case, the interference level reaches its worst value.

The antenna direction of the interference-receiving station may also be designated as the execution condition. For example, in FIG. 20, although the antenna of the interference-receiving station has been designated so as to face a northward direction, the antenna can also be designated to face a different direction.

The interference evaluation apparatus 1 calculates the direction of the interfering station viewed from the position of the interference-receiving station based on the position of the interfering station at the time of evaluating the influence of interference. Then, the interference evaluation apparatus 1 performs influence evaluation with consideration given to information relating to the antenna pattern of the interference-receiving station based on the difference between the direction of the interfering station viewed from the calculated position of the interference-receiving station and the antenna direction of the interference-receiving station. Accordingly, the interference evaluation apparatus 1 evaluates the influence of areal interference under the condition that the antenna direction of the interfering station is the direction of the interfering station and the antenna direction of the interference-receiving station is a designated constant direction, and displays the evaluation result on the map.

Note that regarding the arrangement of the interfering station and the interference-receiving station, as shown in FIG. 20, in the fourth embodiment and onward, a case in which interference evaluation is performed assuming that the position of the interference-receiving station is fixed and the position of the interfering station is a given position is given as an example. On the other hand, in the above-described first to third embodiments, a case in which interference evaluation is performed assuming that the position of the interfering station is fixed and the position of the interference-receiving station is a given position is given as an example. However, in any embodiment, regarding the above-described arrangement of the interfering station and the interference-receiving station, either one may have a fixed position or a given position.

Figure 21:
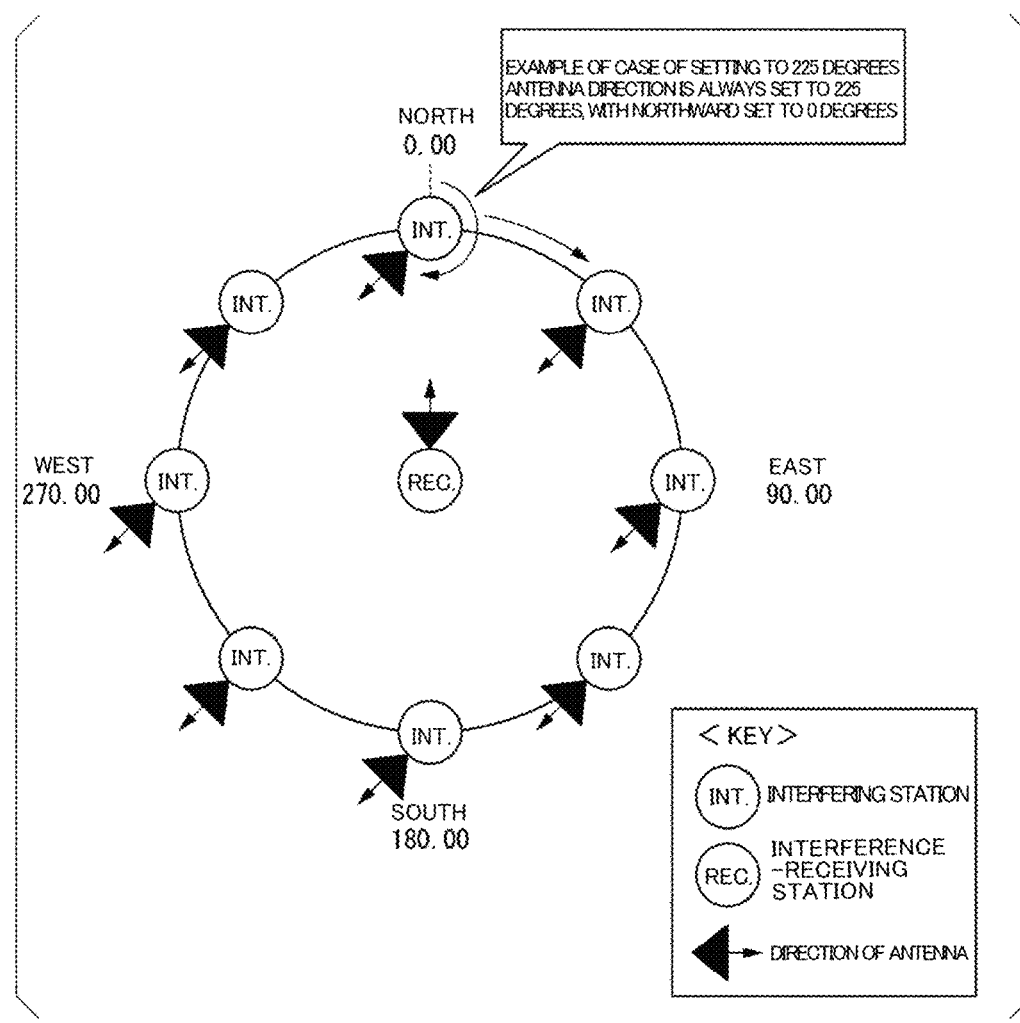
FIG. 21 is a diagram showing an antenna direction in a case where "interfering direction designation" has been designated as the antenna direction in areal interference evaluation.

FIG. 21 is a diagram showing an antenna direction in the case where "interfering direction designation" has been designated as the antenna direction in the areal interference evaluation. Here as well, if the position of the interference-receiving station is known and the position of the interfering station has not been decided, the interference evaluation apparatus 1 evaluates, over an area, the influence of interference from the interfering station on the interference-receiving station in the designated target range of interference evaluation.

For example, if "interfering direction designation" has been designated as the set condition of the antenna direction of the interfering station on the execution condition designation screen hs shown in FIG. 19, the interference evaluation apparatus 1 calculates the interference level assuming that the antenna direction of the interfering station and the antenna direction of the interference-receiving station face a specific direction. That is, in this case, the antenna directions of both the interfering station and the interference-receiving station are the designated azimuthal angle. For example, in the example shown in FIG. 21, if northward is set to 0 degrees, the antenna direction of the interfering station is designated so as to always face a direction of 225 degrees. Also, for example, in the example shown in FIG. 21, the antenna direction of the interference-receiving station is designated so as to face the direction of 0 degrees (northward).

The interference evaluation apparatus 1 calculates the direction of the interfering station viewed from the position of the interference-receiving station based on the position of the interfering station at the time of evaluating the influence of interference. Then, the interference evaluation apparatus 1 performs influence evaluation with consideration given to information relating to the antenna pattern of the interference-receiving station based on the difference between the direction of the interfering station viewed from the calculated position of the interference-receiving station and the antenna direction of the interference-receiving station.

Furthermore, the interference evaluation apparatus 1 performs interference evaluation with consideration given to information relating to the antenna pattern of the interfering station based on the position of the interfering station and the designated antenna direction of the interfering station. Accordingly, the interference evaluation apparatus 1 evaluates the influence of the areal interference under the condition that the antenna direction of the interfering station is always a designated direction and the antenna direction of the interference-receiving station is always a designated direction as well, and displays the evaluation result on the map.

Figure 22:
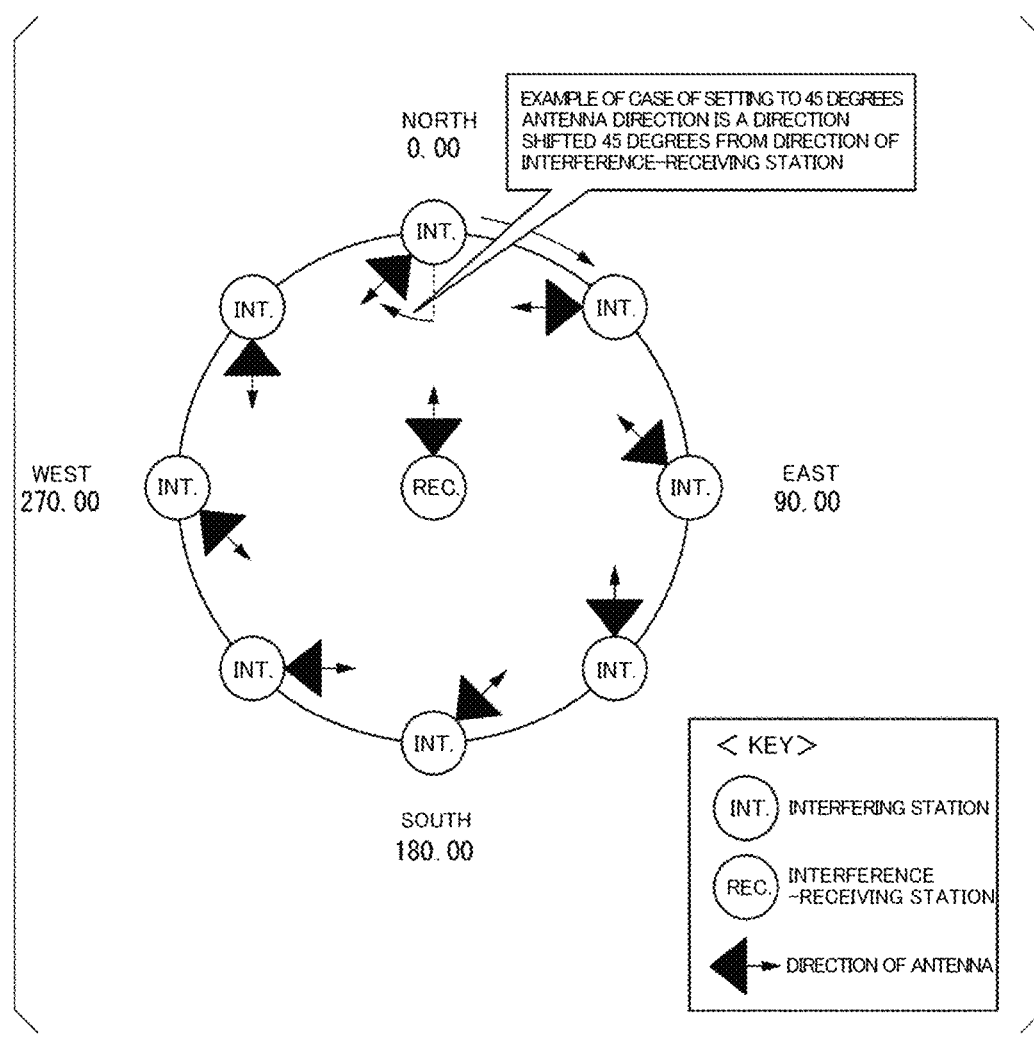
FIG. 22 is a diagram showing an antenna direction in a case where "always certain angle with interference-receiving station" has been designated as the antenna direction in areal interference evaluation.

FIG. 22 is a diagram showing an antenna direction in the case where "always a certain angle with interference-receiving station" has been designated as the antenna direction in the areal interference evaluation. Here as well, if the position of the interference-receiving station is known and the position of the interfering station has not been decided, the interference evaluation apparatus 1 evaluates, over an area, the influence of interference from the interfering station on the interference-receiving station in the designated target range of interference evaluation.

For example, if "always a certain angle with the interference-receiving station" has been designated as the setting condition of the antenna direction of the interfering station on the execution condition designation screen hs shown in FIG. 19, the interference evaluation apparatus 1 calculates the interference level assuming that the antenna direction of the interfering station faces a direction shifted from the direction of the interference-receiving station by a predetermined angle. Also, the interference evaluation apparatus 1 calculates the interference level assuming that the antenna direction of the interference-receiving station faces a certain direction. For example, in the example shown in FIG. 22, the antenna direction of the interfering station is designated so as to face a direction shifted from the direction of the interference-receiving station by 45 degrees. Also, for example, in the example shown in FIG. 22, the antenna direction of the interference-receiving station is designated so as to face the direction of 0 degrees (northward).

The interference evaluation apparatus 1 calculates the direction of the interfering station viewed from the position of the interference-receiving station based on the position of the interfering station at the time of evaluating the influence of interference. Then, the interference evaluation apparatus 1 performs influence evaluation with consideration given to information relating to the antenna pattern of the interference-receiving station based on the difference between the direction of the interfering station viewed from the calculated position of the interference-receiving station and the antenna direction of the interference-receiving station.

Furthermore, the interference evaluation apparatus 1 performs interference evaluation with consideration given to information relating to the antenna pattern of the interfering station based on the position of the interfering station and the antenna direction of the interfering station shifted from the direction of the interference-receiving station by a predetermined angle. Accordingly, the interference evaluation apparatus 1 evaluates the influence of the areal interference under the condition that the antenna direction of the interfering station is a direction that is shifted from the direction of the interference-receiving station by a predetermined angle and the antenna of the interference-receiving station has a designated certain direction.

Figure 23:
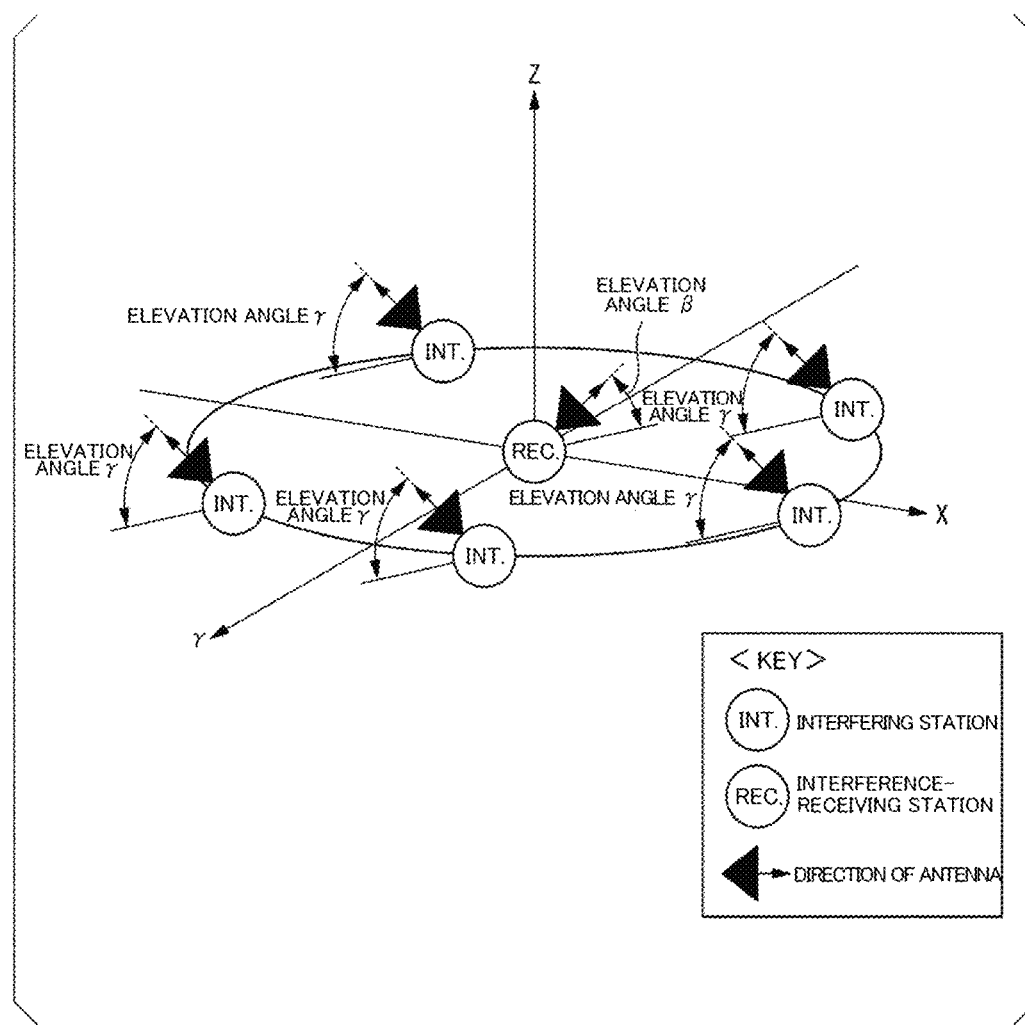
FIG. 23 is a diagram showing an antenna direction in a case where an elevation angle has been designated as the antenna direction in areal interference evaluation.

FIG. 23 is a diagram showing an antenna direction in the case where the elevation angle has been designated as the antenna direction in the areal interference evaluation. FIGS. 20 to 22 described above showed interference evaluation in the case where the antenna directions of the interfering station and the interference-receiving station have been designated for only directions (i.e., azimuthal angles) on a horizontal surface including the interfering station and the interference-receiving station. On the other hand, FIG. 23 shows an interference evaluation in the case where the antenna directions of the interfering station and the interference-receiving station have been designated for directions on a vertical plane (i.e., elevation angles), as well as directions on a horizontal plane.

The azimuthal angles (X-Y plane in FIG. 23) of the antenna directions of the interfering station and the interference-receiving station illustrated as examples in FIG. 23 are the same as the azimuthal angles of the antenna directions of the interfering station and the interference-receiving station shown in FIG. 21. Furthermore, the elevation angle of the antenna direction of the interfering station illustrated as an example in FIG. 23 is a designated predetermined elevation angle γ. Also, the elevation angle of the antenna direction of the interference-receiving station illustrated as an example in FIG. 23 is a designated predetermined elevation angle β.

In this manner, the interference evaluation apparatus 1 may also perform interference evaluation with consideration given not only to the antenna directions (azimuthal angles) on a horizontal plane of the interfering station and the interference-receiving station, but also the antenna directions (elevation angles) on a vertical plane of the interfering station and the interference-receiving station.

Figure 24:
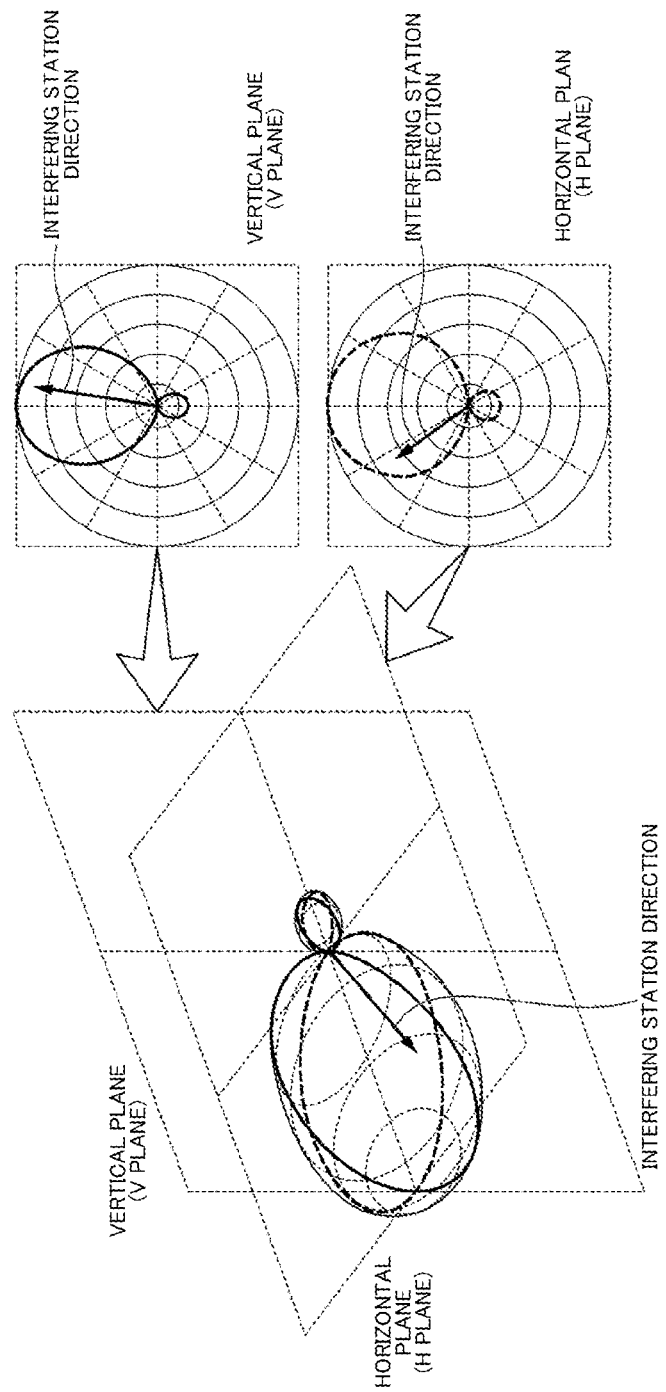
FIG. 24 is a diagram showing an example of an antenna pattern on a vertical plane (V plane), an antenna pattern on a horizontal plane (H plane), and a three-dimensional antenna pattern.

FIG. 24 is a diagram showing an example of an antenna pattern on a vertical plane (V plane), an antenna pattern on a horizontal plane (H plane), and a three-dimensional antenna pattern obtained by combining the antenna pattern on the vertical plane (V plane) and the antenna pattern on the horizontal plane (H plane). The interference evaluation apparatus 1 forms a three-dimensional antenna pattern based on the antenna pattern on the vertical plane (V plane) and the antenna pattern on the horizontal plane (H plane) in interference evaluation. Then, the interference evaluation apparatus 1 calculates the gain with consideration given to the horizontal angle and the elevation angle of the antenna direction and uses the calculated gain in the calculation of the interference level.

Specifically, for example, it is assumed that the three-dimensional antenna pattern shown in FIG. 24 is formed for the antenna of the interference-receiving station. The arrow sign drawn on the vertical plane (V plane) on the right side of FIG. 24 indicates the direction of the interfering station in the vertical direction. Also, the arrow sign drawn on the horizontal plane (H plane) on the right side of FIG. 24 indicates the direction of the interfering station in the horizontal direction. The interference evaluation apparatus 1 specifies the direction (direction indicated by the arrow sign drawn on the left side of FIG. 24) of the interfering station in the configuration of the three-dimensional antenna pattern based on these two directions.

This makes it possible for the interference evaluation apparatus 1 to calculate the appropriate gain of the interfering station direction based on the antenna direction of the interference-receiving station. Also, the interference evaluation apparatus 1 can use the calculated value of the appropriate antenna gain in the calculation of the interference level.

In this manner, the interference evaluation apparatus 1 according to the fourth embodiment evaluates the radio-wave interference with consideration given to at least one of the antenna direction of the first radio station (interfering station or interference-receiving station) and the antenna direction of the second radio station (interference-receiving station or interfering station).

Fifth Embodiment

Hereinafter, interference evaluation performed by an interference evaluation apparatus according to a fifth embodiment of the present invention will be described with reference to the drawings.

Figure 25:
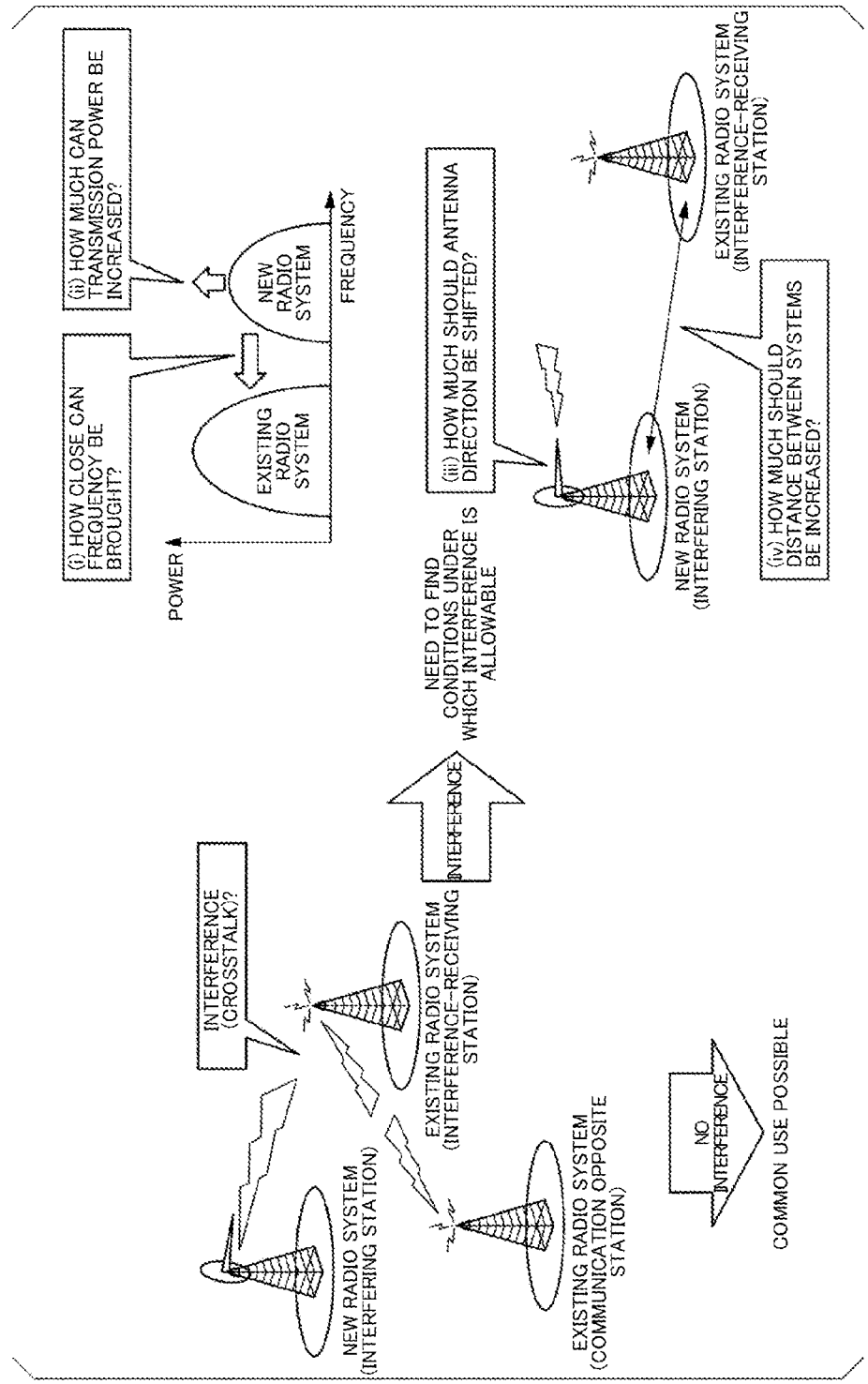
FIG. 25 is a diagram for illustrating an overview of interference evaluation.

FIG. 25 is a diagram for illustrating an overview of interference evaluation. Mainly the following two procedures are performed in interference evaluation that is performed when a radio system is newly constructed near an existing radio system. One procedure is performing determination regarding whether or not interference (crosstalk) will occur between the radio systems, as shown on the left side of FIG. 25. Then, the other procedure is performing specification of conditions under which interference between the radio systems is allowable while changing the specifications and the set conditions of the radio system as shown on the right side of FIG. 25 if interference occurs. Hereinafter, a more specific description will be given.

As shown on the left side of FIG. 25, if a new radio system (interfering station) is to be constructed near two opposing existing radio systems (one being an interference-receiving station), first, determination is performed regarding whether or not interference (mixed signals) will occur in one existing radio system (interference-receiving station). If the result of the determination is "no interference", the existing radio system and the new radio system can be used in common. On the other hand, if the result of the determination is "interference is present", conditions under which the interference is allowable need to be specified.

On the right side of FIG. 25, several examples of methods for specifying conditions under which interference is allowable are given. For example, on the upper portion of the right side of FIG. 25, a graph of a frequency spectra of the existing radio system (interference-receiving station) and the new radio system (interfering station) are shown schematically as examples. In the graph of the frequency spectra, the horizontal axis indicates the frequency and the vertical axis indicates power.

In the interference evaluation, for example, (i) the range of frequencies of the new radio system (interfering station that can approach the frequencies of the existing radio system (interference-receiving station) is specified based on the graph of the frequency spectra. Also, in the interference evaluation, for example, (ii) the range of power of the new radio system (interfering station) that can be raised is specified based on the graph of the frequency spectra.

Also, for example, on the lower portion of the right side of FIG. 25, the arrangement of the existing radio system (interference-receiving station) and the new radio system (interfering station) is shown schematically. For example, (iii) an appropriate angle in the case where the antenna direction of the new radio system (interfering station) is shifted with respect to the direction of the existing radio system (interference-receiving station) is specified based on the arrangement of the existing radio system (interference-receiving station) and the new radio system (interfering station). Also, (iv) an appropriate distance between the existing radio system (interference-receiving station) and the new radio system (interfering station) is specified.

Figure 26:
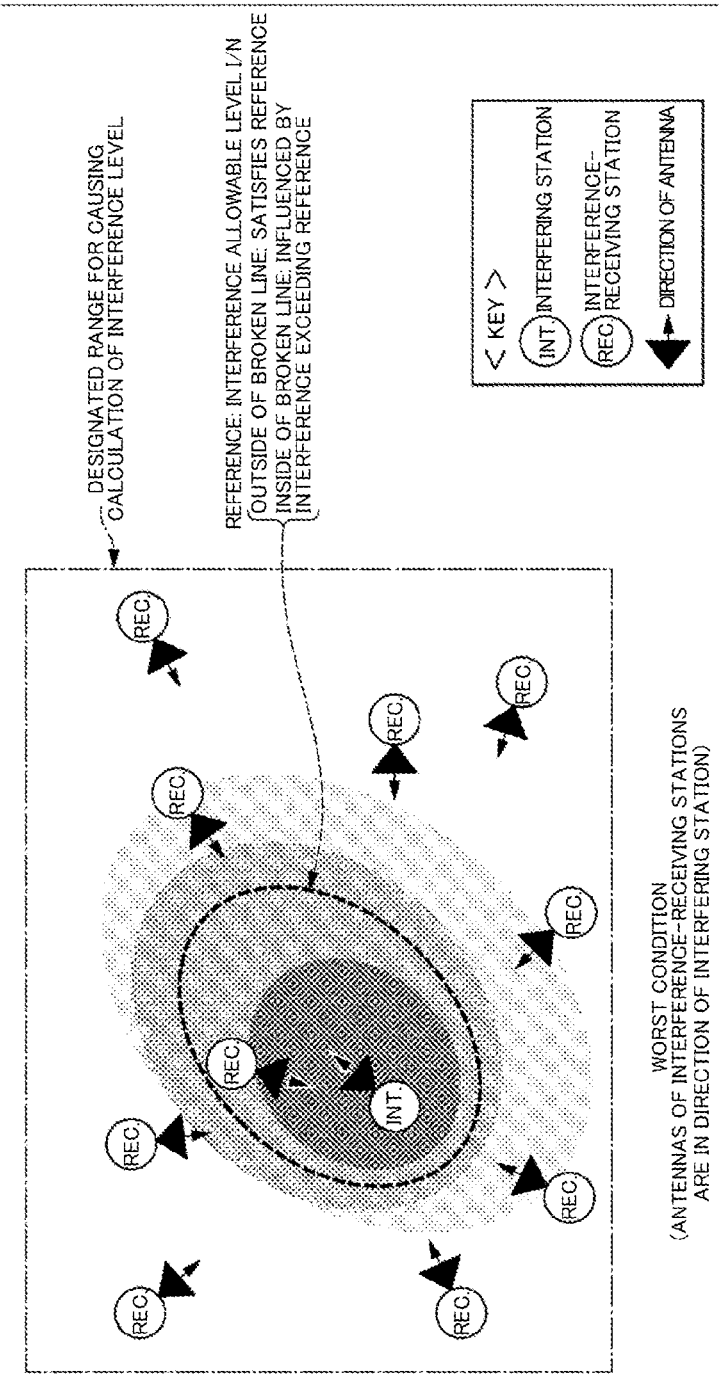
FIG. 26 is a diagram showing set conditions for areal interference evaluation in the first to fourth embodiments of the present invention.

FIG. 26 is a diagram showing set conditions for areal interference evaluation in the above-described first to fourth embodiments. In the above-described first to fourth embodiments, as shown in FIG. 26, it is envisioned that calculation of the interference level is performed under the condition that the antenna direction of the interference-receiving station faces the direction of the interfering station and the reference value of the interference level is an allowable interference level I/N. This is a "worst" case. Here, I indicates the interference level of interference received by the interference-receiving station from the interfering station, and N indicates the interference level obtained based on noise included in the reception apparatus of the interference-receiving station.

Also, the allowable interference level I/N given also in the description below corresponds to an interference-receiving requirement I/N stated in the first embodiment, which was given before (see paragraph 0034).

FIG. 26 shows the direction of the antenna of the interference-receiving station in a designated range (in a range surrounded by the one-dot chain line in the drawing) for causing calculation of the interference level. As shown in FIG. 26, although interference-receiving stations are arranged dispersed in the designated range, the antenna directions of all of the interference-receiving stations face the direction of the interfering station.

Also, FIG. 26 shows that the darker the color of a region is, the more significant the influence of interference is. For this reason, the nearer a region is to the interfering station, the darker the color is. Note that in the regions with no color in the designated range, there is influence of interference from the interfering station, although it is at a lower level. Here, the interference level (reference level) that can be allowed by the interference-receiving station is the above-described interference allowable level I/N.

Note that the broken line shown in FIG. 26 is a boundary line indicating the position at which the above-described interference allowable level I/N is reached (reference level position). That is, the inside of the broken line is a region in which the interference level exceeding the interference allowable level I/N is reached, and the outside of the broken line is a region within the range of the interference allowable level I/N.

However, if considering an actual environment in a case in which interference is problematic, such as that shown in FIG. 25 before, it can be said that the set conditions obtained using the interference allowable level calculated using the interference level obtained based on the fact that the antenna direction of the interference-receiving station always faces the direction of the interfering station as shown in FIG. 26 and the noise mixed into the reception apparatus of the interference-receiving station are set conditions that are safer, that is, set conditions that include leeway.

Figure 27:
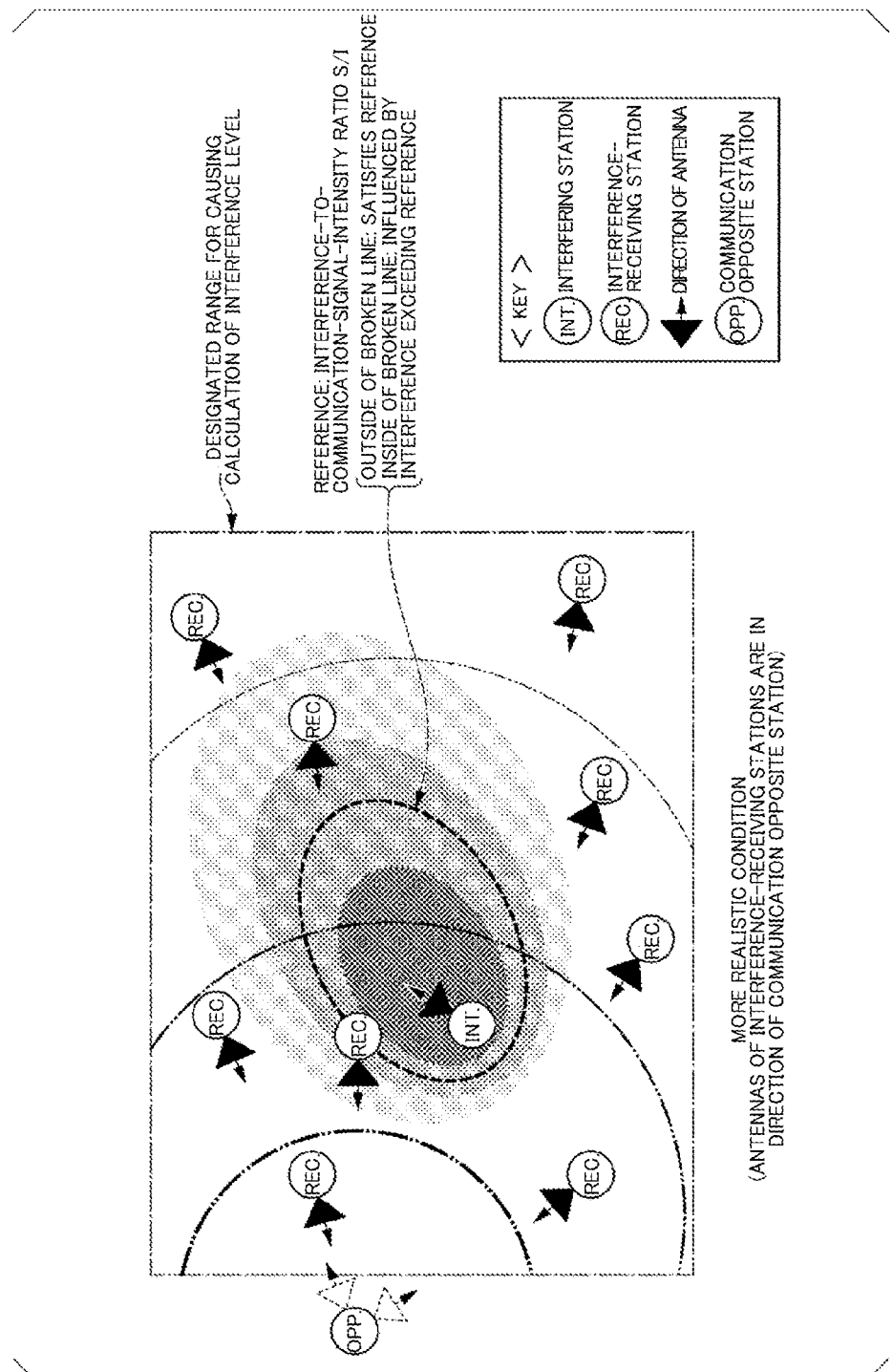
FIG. 27 is a diagram showing set conditions for areal interference evaluation in the fifth embodiments of the present invention.
Figure 28:
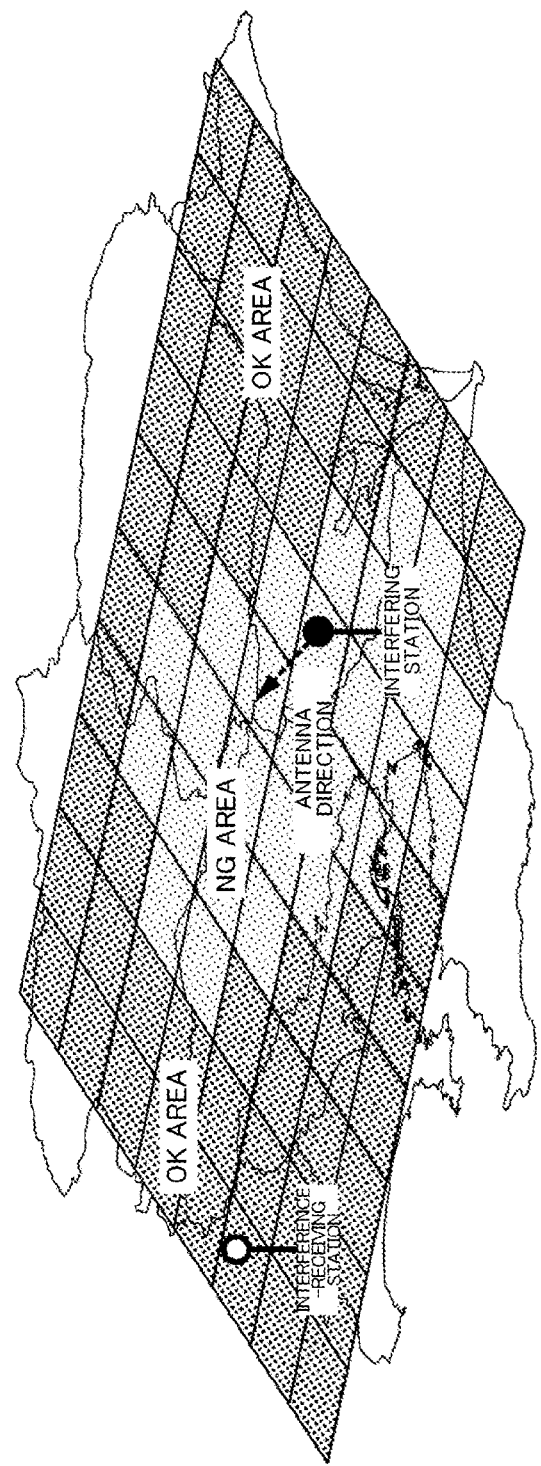
FIG. 28 is a schematic diagram showing an overview of areal interference evaluation.
Figure 29:
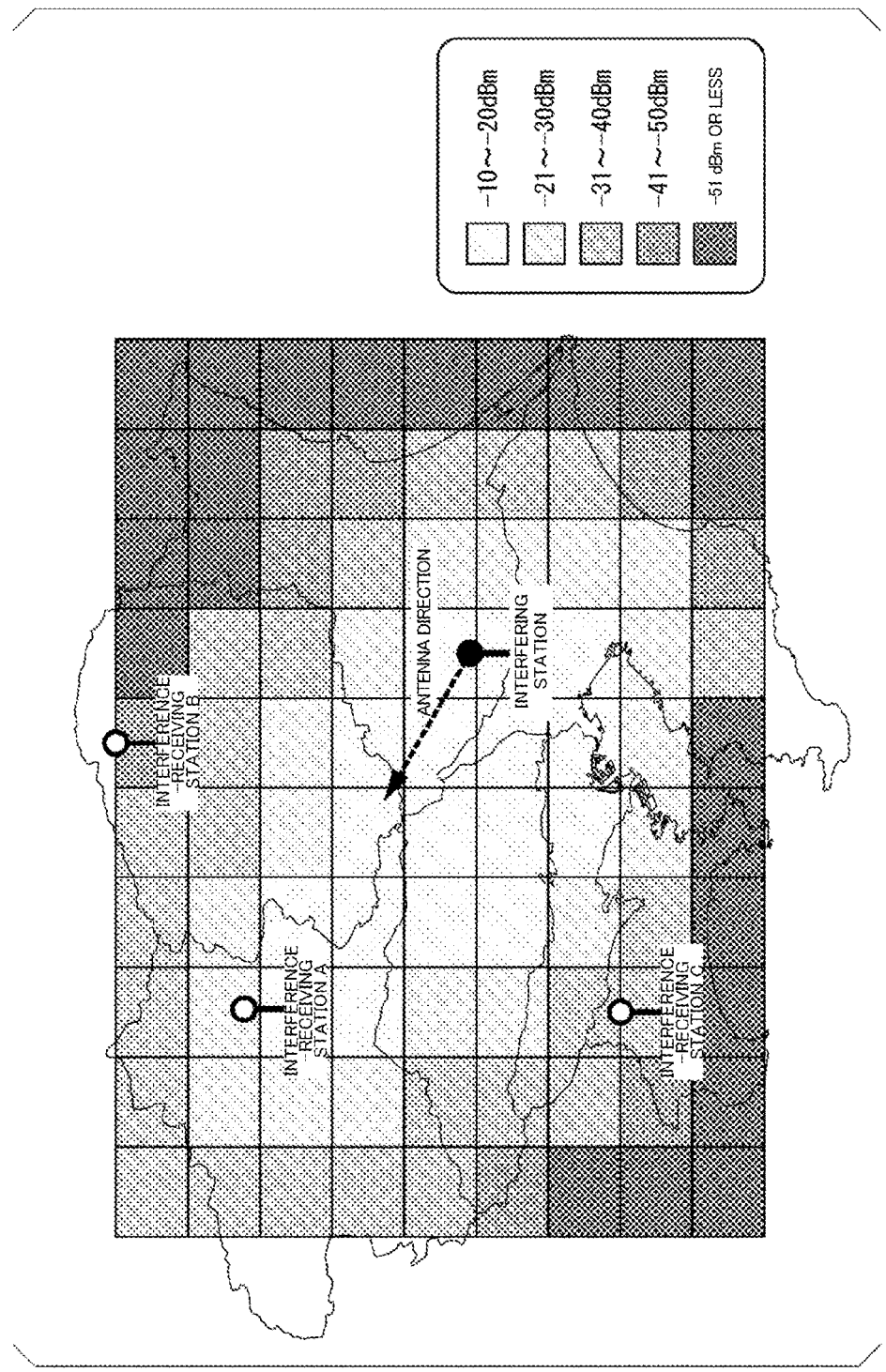
FIG. 29 is a schematic diagram showing an overview of evaluation of an area reached by radio waves.

On the other hand, FIG. 27 is a diagram showing set conditions for areal interference evaluation in the fifth embodiment of the present invention. In the fifth embodiment, as shown in FIG. 27, the antenna direction of the interference-receiving station faces the direction of the communication opposite station.

Also, in the fifth embodiment, the interference level serving as the reference at which the interference-receiving station can allow interference is an interference-to-communication-signal-intensity ratio S/I, which is a value corresponding to the intensity S of receiving the communication signal of the communication opposite station. Here, I is the interference level of interference received by the interference-receiving station from the interfering station. Unlike the interference-receiving requirement I/N, which was a reference for allowing interference in the interference-receiving station used in the first to fourth embodiments stated before, the interference-to-communication-signal-intensity ratio S/I is used in the fifth embodiment. As described above, due to this kind of set condition, with the set condition shown in FIG. 27, it is possible to perform calculation of an interference level obtained by modeling an environment that is closer to reality compared to the set condition shown in FIG. 26.

FIG. 27 shows the direction of the antenna of the interference-receiving station in a designated range for allowing calculation of the interference level, that is, in a range surrounded by the one-dot chain line in the drawing. As shown in FIG. 27, although interference-receiving stations are arranged dispersed in the designated range, the antenna directions of all of the interference-receiving stations face the direction of the communication opposite station. Also, in FIG. 27, the signal level of the reception signal from the communication opposite station is indicated by three arcs of two-dot chain lines. The thicker the two-dot chain line is, the higher the signal level of the reception signal of communication that is indicated is.

In the calculation of the interference level obtained under the set conditions shown in FIG. 27, specifically, the antenna direction of the interference-receiving station, that is, the direction of the communication opposite station viewed from the interference-receiving station, is calculated based on the position of the communication opposite station and the positions of the interference-receiving stations in the designated range for causing calculation of the interference level. Furthermore, in the calculation of the interference level, calculation of the signal levels at which the radio signal transmitted from the communication opposite station is received in the respective interference-receiving stations is performed. Note that in this calculation, topographical information between the communication opposite station and the interference-receiving stations is also given consideration.

According to the result of this calculation, the interference evaluation apparatus 1 can keep track of the signal levels of the radio signals transmitted from the communication opposite station at the positions of the interference-receiving stations. Accordingly, the interference evaluation apparatus 1 can calculate the interference level serving as a reference at which the interference-receiving stations can allow interference, based on the above-described interference-to-communication-signal-intensity ratio S/I (described in paragraph 0219).

Also, the interference evaluation apparatus 1 can keep track of the direction of the interfering station viewed from the interference-receiving stations based on the position of the interfering station and the positions of the interference-receiving stations. Accordingly, the interference evaluation apparatus 1 can calculate the angle differences between the antenna directions of the interference-receiving stations determined previously and the direction of the interfering station. Then, the interference evaluation apparatus 1 stores the gain for the angle difference by checking the antenna pattern of the interference-receiving stations. Also, due to the interference evaluation apparatus 1 being able to keep track of the directions of the interference-receiving stations viewed from the interfering station based on the position of the interfering station and the position of the interference-receiving station, the interference evaluation apparatus 1 can calculate the angle difference between the antenna direction of the interfering station calculated in advance and the direction of the interference-receiving station. Then, the interference evaluation apparatus 1 records the gain of the angle different by checking the antenna pattern of the interfering station.

The interference evaluation apparatus 1 performs calculation of the interference level received by the interference-receiving station with consideration given to the gain of the angle difference obtained based on the antenna pattern of the interfering station and the antenna pattern of the interference-receiving station and information on the topography between the interfering station and the interference-receiving station. Then, the interference evaluation apparatus 1 performs determination regarding whether or not the interference level calculated at the position of the interference-receiving station is an allowable interference level by comparing the reference level of the interference calculated previously and the interference levels calculated at the respective positions of the interference-receiving stations.

In this manner, the interference evaluation apparatus 1 according to the fifth embodiment evaluates the radio-wave interference with consideration given to the reception signal intensity of the radio waves sent from the communication opposite station that performs communication with the second radio station (interference-receiving station or interfering station).

Note that the interference evaluation may also be performed with the interfering station and the interference-receiving station switched in the above-described embodiments. For example, in the above-described first to third embodiments and the fifth embodiment, a configuration was used in which the interference evaluation performed in the case where the interference-receiving station is arranged at a given position is performed under the condition that the position of the interfering station is known (fixed). However, it is also possible to use a configuration in which interference evaluation performed in the case where the interfering station is installed at a given position is performed under the condition that the position of the interference-receiving station is known (fixed). Also, for example, in the above-described fourth embodiment, a configuration was used in which interference evaluation performed in the case where the interfering station is installed at a given position is performed under the condition that the position of the interference-receiving station is known (fixed). However, it is also possible to use a configuration in which interference evaluation performed in the case where the interference-receiving station is installed at a given location is performed under the condition that the position of the interfering station is known (fixed).

Note that the drawings showing the results of interference evaluation are all shown schematically in order to facilitate comprehension of the description. For example, although the regions indicating the ranges in which the influence of interference is allowable are oval-shaped in FIGS. 9, 11, 24, 26, and 27, in actuality, the regions commonly have complex shapes due to consideration being given to the antenna patterns and the topographical information.

Note that the drawings showing meshes segmenting the target range of the interference evaluation (FIGS. 13, 16, 28, and 29) are all shown schematically in order to facilitate comprehension of the description. In actual interference evaluation, the number of squares in a mesh is commonly at least 100 [squares] vertically×100 [squares] horizontally.

As described above, if areal interference evaluation is to be performed by including the above-described configuration, the interference evaluation apparatus 1 according to the first to third embodiments can reduce the calculation amount while maintaining the accuracy of the interference evaluation.

Also, as described above, the interference evaluation apparatus 1 according to the fourth and fifth embodiments can perform interference evaluation under various conditions since the antenna directions of the interfering station and the interference-receiving station can be designated as conditions in the case of performing areal interference evaluation due to including the above-described configuration. Also, since the interference evaluation apparatus 1 according to the fourth and fifth embodiments can perform analysis, comparison, and the like of the results of interference evaluation, it is possible to provide more appropriate common-use conditions for multiple radio systems that can interfere with each other.

Also, as described before, due to including the above-described configuration, the interference evaluation apparatus 1 according to the fifth embodiment can perform interference evaluation under conditions closer to those of an actual environment, since the reference for the interference level according to the signal level of the radio signal from the communication opposite station can be set under the condition that the antenna direction of the interference-receiving station is set to the direction of the communication opposite station.

Although embodiments of this invention have been described in detail above with reference to the drawings, specific configurations are not limited to these embodiments, and encompass designs and the like that do not depart from the gist of the invention.

A portion or the entirety of the interference evaluation apparatus 1 according to the above-described embodiments may also be realized by a computer. In this case, the interference evaluation apparatus 1 may be realized by recording a program for realizing functions thereof in a computer-readable recording medium, causing a computer system to load the program recorded in the recording medium, and executing the program. Note that "computer system" in this context is assumed to include an OS and hardware such as peripheral devices. Also "computer-readable recording medium" refers to a storage apparatus such as a flexible disk, a magneto-optical disk, a transportable medium such as a ROM or a CD-ROM, or a hard disk built into a computer system. Furthermore, "computer-readable recording medium" may also encompass a recording medium in which a program is stored dynamically for a short amount of time, such as a communication line used when transmitting the program via a network such as the Internet and a communication line such as a telephone line, or a recording medium in which a program is stored for a certain amount of time, such as a volatile memory in a computer system serving as a server or a client in such a case. Also, the above-described program may also be for realizing some of the above-described functions, may also be able to realize the above-described function in combination with a program already stored in the computer system, and may also be realized using a programmable logic device such as an FPGA (Field Programmable Gate Array).

REFERENCE SIGNS LIST

1 Interference evaluation apparatus
10 Control unit
11 Input setting/selection/registration change instruction unit
12 Interference method (menu) selection unit
13 Station information input/registration unit
14 Interfering/interference-receiving station selection unit
15 History selection unit
16 Calculation condition setting unit
17 Calculation result display designation unit
18 Interference power calculation/acceptance determination unit
19 Calculation result table display unit
20 Storage unit
30 Input/output unit
201 Station DB
202 History storage unit
203 Map information DB
301 Operation input unit
302 Display unit

The invention claimed is:

1. An interference evaluation method for evaluating, over an area, radio-wave interference that occurs between a first radio station and a second radio station, the interference evaluation method comprising: a distinguishing step of acquiring information indicating topographic cross-sections of respective azimuths centered about the first radio station, and distinguishing each topographic cross-section into a segment in which there is visibility from the position of the first radio station and a segment in which there is no visibility from the position of the first radio station; and a specification step of specifying a position at which a desired interference amount is reached based on a distance between the first radio station and the second radio station in a segment distinguished as having visibility from the position of the first radio station, and specifying a position at which the desired interference amount is reached by evaluating the radio-wave interference for each square of an evaluation target region segmented into squares in a segment distinguished as having no visibility from the position of the first radio station.

2. The interference evaluation method according to claim 1, wherein in the distinguishing step, a segment in which there is no visibility from the position of the first radio station is distinguished based on a position of a ridge included in the topographic cross-section.

3. The interference evaluation method according to claim 1, wherein in the specification step, by starting a search using a position at a distance equal to the distance between the first radio station and a position at which the desired interference amount is reached, the position having been specified in the evaluation of the radio-wave interference for a first topographic cross-section, as an initial position of a position search in the evaluation of the radio-wave interference for a second topographic cross-section adjacent to the first topographic cross-section, the radio-wave interference for the second topographic cross-section is evaluated.

4. The interference evaluation method according to claim 1, further comprising a number provision step of providing direction numbers to the respective azimuths centered about the first radio station, wherein in the specification step, if the radio-wave interference is to be evaluated for each square of the evaluation target region segmented into the squares, the radio-wave interference is evaluated only for a square distinguished as being an evaluation target based on the direction number and the distance from the first radio station.

5. The interference evaluation method according to claim 1, wherein in the specification step, the radio-wave interference is evaluated with consideration given to at least one of an antenna direction of the first radio station and an antenna direction of the second radio station.

6. The interference evaluation method according to claim 1, wherein in the specification step, the radio-wave interference is evaluated with consideration given to a reception signal intensity of radio waves emitted from a communication opposite station configured to perform communication with the second radio station.

7. An interference evaluation apparatus configured to evaluate, over an area, radio-wave interference that occurs between a first radio station and a second radio station, comprising
 a processor; and
 a storage medium having computer program instructions stored thereon, when executed by the processor, perform to:
acquire information indicating topographic cross-sections of respective azimuths centered about the first radio station, and distinguish each topographic cross-section into a segment in which there is visibility from the position of the first radio station and a segment in which there is no visibility from the position of the first radio station; and specify a position at which a desired interference amount is reached based on a distance between the first radio station and the second radio station in a segment distinguished as having visibility from the position of the first radio station, and specify a position at which the desired interference amount is reached by evaluating the radio-wave interference for each square of an evaluation target region segmented into squares in a segment distinguished as having no visibility from the position of the first radio station.

8. A non-transitory computer-readable medium having computer-executable instructions that, upon execution of the instructions by a processor of a computer, cause the computer to execute the interference evaluation method according to claim 1.

* * * * *